(12) United States Patent
Stundner et al.

(10) Patent No.: US 8,380,642 B2
(45) Date of Patent: Feb. 19, 2013

(54) METHODS AND SYSTEMS FOR SELF-IMPROVING REASONING TOOLS

(75) Inventors: Michael Stundner, Baden (AT); Gustavo Nunez, Baden (AT); Georg Zangl, Laxenburg (AT); Andreas Al-Kinani, Untersiebenbrunn (AT)

(73) Assignee: Schlumberger Technology Corporation, Sugar Land, TX (US)

( * ) Notice: Subject to any disclaimer, the term of this patent is extended or adjusted under 35 U.S.C. 154(b) by 801 days.

(21) Appl. No.: 12/505,592

(22) Filed: Jul. 20, 2009

(65) Prior Publication Data

US 2010/0138368 A1 Jun. 3, 2010

Related U.S. Application Data

(60) Provisional application No. 61/119,444, filed on Dec. 3, 2008.

(51) Int. Cl.
*G06F 15/18* (2006.01)
(52) U.S. Cl. ..................................... 706/12
(58) Field of Classification Search ............ None
See application file for complete search history.

(56) References Cited

U.S. PATENT DOCUMENTS

| | | | |
|---|---|---|---|
| 5,121,467 A | 6/1992 | Skeirik | |
| 6,434,435 B1 | 8/2002 | Tubel et al. | |
| 6,535,795 B1 * | 3/2003 | Schroeder et al. | 700/266 |
| 7,069,255 B1 | 6/2006 | Seiler et al. | |
| 2009/0018918 A1 * | 1/2009 | Moneypenny et al. | 705/14 |

FOREIGN PATENT DOCUMENTS

WO 99/60247 A1 11/1999

OTHER PUBLICATIONS van der Gaag et al., "Efficient multiple-disorder diagnosis by strategic focusing", Technical Report UU-CS-1994-23, 1994, Utrecht University, The Netherlands, pp. 12.*
Stundner et al. "Production Performance Monitoring Workflow", SPE 103757, 2006, pp. 1-6.*
Yoon et al. "Integration Analysis of Diverse Genomic Data Using Multi-clustering Results", in N. Maglaveras et al. (Eds.): ISBMDA 2006, LNBI 4345, 2006, pp. 37-48.*
Bayes, Thomas, "An Essay Towards Solving a Problem in the Doctrine of Chances by Rev. Mr. Bayes, F.R.S., communicated by Mr. Price, in a letter to John Canton, A.M., F.R.S.," Philosophical Transactions of the Royal Society of London, 1763, pp. 370-418, vol. 53.
Weidl, G. et al., "Applications of object-oriented Bayesian networks for condition monitoring, root cause analysis and decision support on operation of complex continuous processes," Computers & Chemical Engineering, Aug. 15, 2005, pp. 1996-2009, vol. 29, No. 9.
Schmidt, Douglas C., et al., "A methodology for formulating, formalizing, validating, and evaluating a real-time process control advisor," IIE Transactions, 1998, pp. 235-245, vol. 30, No. 5.

* cited by examiner

*Primary Examiner* — Jeffrey A. Gaffin
*Assistant Examiner* — Li-Wu Chang
(74) *Attorney, Agent, or Firm* — Colin Wier

(57) ABSTRACT

Implementations that integrate data-driven modeling and knowledge into self-improving reasoning systems and processes are described. For example, an implementation of a method may include determining at least one recommended action using a reasoning component having a data-driven modeling portion and a knowledge-based portion. Such determining includes integrating one or more determination aspects determined by the data-driven modeling portion, and one or more additional determination aspects determined by the knowledge-based portion.

16 Claims, 16 Drawing Sheets

METHODS AND SYSTEMS FOR SELF-IMPROVING REASONING TOOLS

CROSS-REFERENCE TO RELATED APPLICATIONS

This patent application claims priority under 35 USC §119 (e) from U.S. Provisional Patent Application No. 61/119,444 filed Dec. 3, 2008, which application is incorporated herein by reference.

BACKGROUND

Many decision-making processes face continuously changing environments. For example, processes like producing oil and gas from reservoirs usually involve changing environments that cannot be generalized easily. Decision support systems or process control systems are often customized for individual operating environments. There are best practices in place, which often are changed and adapted to cope with individual challenges when operating oil and gas reservoirs on a case-by-case basis.

In conventional oil and gas production processes, data-conditioning workflows are typically not in place, and human production workflows are typically not centrally managed or appropriately automated. Data flow from sensors to applications and model validation can be major bottlenecks in real-time environments. While data streams in oil and gas production often go real-time, corresponding workflow execution typically lags behind or even breaks. Expert and user knowledge is not well captured in such distributed decision support fragments for use in future analysis. In addition, decision-making processes often depend on user knowledge and individual experience, therefore each situation can lead to non-standardized workflows. Decision support systems often cannot readily cope with changing business and operating environments. Ultimately, operators can lose business opportunities due to poor asset awareness.

SUMMARY

Methods and systems for self-improving reasoning tools are disclosed. In some implementations, a method includes determining at least one recommended action using a reasoning component having a data-driven modeling portion and a knowledge-based portion. Such determining includes integrating one or more determination aspects determined by the data-driven modeling portion, and one or more additional determination aspects determined by the knowledge-based portion. Further aspects of methods and systems in accordance with the teachings of the present disclosure are described more fully below.

BRIEF DESCRIPTION OF THE DRAWINGS

Various embodiments and aspects of the present disclosure may be described below with reference to the accompanying figures, in which the same or similar reference numbers may be used to reference like features and components.

DETAILED DESCRIPTION

Figure 1:
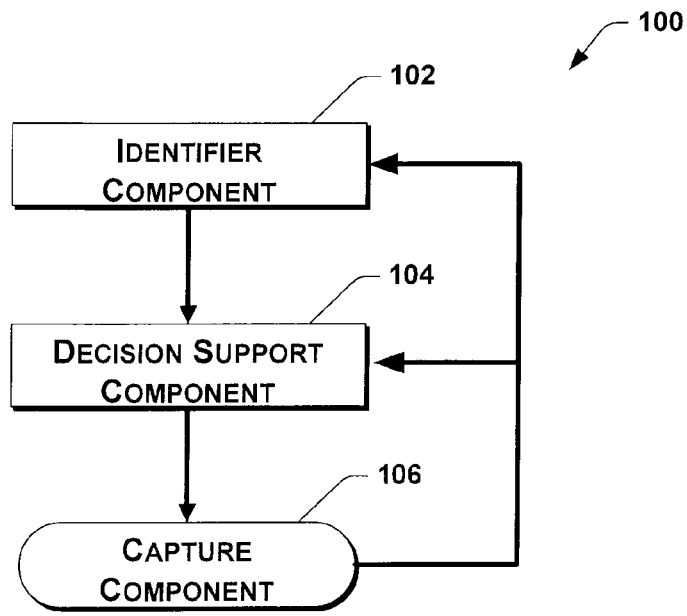
FIG. 1 illustrates a flowchart of an embodiment of an advisory process in accordance with the teachings of the present disclosure.

This disclosure is directed to methods and systems for self-improving reasoning tools for use in dynamic environments, such as those involved in oil and gas production operations. In general, implementations of methods and systems in accordance with the teachings of the present disclosure may integrate data-driven modeling and knowledge into self-improving reasoning tools to take into account one or more of changing asset management objectives and constraints.

More specifically, in at least some implementations in accordance with the present disclosure, a hybrid artificial intelligence system may integrate at least one of data-driven tools with expert reasoning tools to provide an adaptive system which makes expert knowledge readily deployable across changing operating environments. In this way, knowledge capturing and deployment may advantageously be integrated into some or all steps (or activities) during operations in dynamic environments, including decision making and performance review processes.

In further implementations, data-driven modeling and knowledge may be integrated into a self-improving reasoning tool to provide improved performance of one or more of the following activities: capturing events based on key performance indicators and knowledge captured, identifying business opportunities in an automated (or partially automated) and consistent way, making best possible decisions, taking recommended actions, managing constraints in an optimized way, meeting defined objective functions, and learning from results obtained. Thus, integrating at least one of data-driven modeling and knowledge into a self-improving reasoning tool may advantageously enable expert systems or processes to be adaptive to changing environments and to learn from new data, and may overcome the brittleness of the rigorous logic in conventional systems or processes.

Terminology

In the following discussion, the term "expert system" may be used to refer to a system which may be, or may include, a computer program (or equivalent hardware, software, firmware, or combination thereof) that contains at least some of the knowledge or analytical skill of one or more human experts related to a specific subject. Such systems or programs may incorporate concepts or knowledge derived by experts to provide, for example, analytical capabilities to users of such systems. In at least some implementations, an expert system may include a set of rules that may analyze information (usually supplied by the user of the system) about a specific class of problems, and may recommend one or more courses of user action. In addition, in some implementations, an expert system may also provide mathematical analysis of a problem, and may utilize what appears to be reasoning or analytical capabilities to reach a conclusion.

The term "wizard" as used herein may be used to refer to an interactive computer program (or equivalent hardware or firmware) that helps a user to solve a problem. In some implementations, a wizard may be a rule-based expert system. In other implementations, a wizard may sequentially guide a user through a series of choices.

As used herein, the term "Bayesian network" (or "belief network") may be used to refer to a probabilistic graphical model that represents a set of variables and their probabilistic interdependencies. For example, a Bayesian network may represent a probabilistic relationship, and may exhibit one or more of the following aspects: the often subjective nature of the input information; the reliance on conditioning (e.g. Bayes's conditioning) as the basis for updating information; the distinction between causal and evidential modes of reasoning, which underscores one or more theories of Thomas Bayes as described, for example, in a posthumous paper entitled "*An Essay Towards Solving a Problem in the Doctrine of Chances* by Rev. Mr. Bayes, F. R. S., communicated by Mr. Price, in a letter to John Canton, A. M., F. R. S." published in *Philosophical Transactions of the Royal Society of London*, at vol. 53: 370-18 (1763). In some implementations, Bayesian networks may be directed acyclic graphs whose nodes represent variables, and whose arcs encode conditional interdependencies between the variables. Nodes can represent any kind of variable, including a measured parameter, a hypothesis, a random variable, or any other suitable variable. Typically, efficient algorithms exist that perform inference and learning in Bayesian networks. Bayesian networks that model sequences of variables (e.g. speech signals, protein sequences, etc.) may be called dynamic Bayesian networks. Generalizations of Bayesian networks that can represent and solve decision problems under uncertainty may be called influence diagrams. In some implementations, integrating data-driven modeling and knowledge into a self-improving reasoning tool may be used to solve complex Bayesian networks derived directly from data. The structure of the networks may be defined by users or experts while training data are fed through a data-driven model.

As used herein, the term "self-organizing map" (SOM) may be used to refer to a type of artificial neural network that is trained using unsupervised learning to produce a low-dimensional (typically two dimensional), discretized representation of an input space of one or more training samples, called a map. Self-organizing maps (sometimes referred to as "Kohonen" maps) typically seek to preserve topological properties of an input space, making such SOM's useful for visualizing low-dimensional views of high-dimensional data, similar to so-called multi-dimensional scaling. Like other artificial neural networks, SOM's may operate in a training mode and in a mapping mode. In the training mode, a self-organizing map may be built or augmented using input examples. In some implementations, training during the training mode may be a competitive process, and may be termed "vector quantization." On the other hand, mapping activities during the mapping mode may automatically classify a new input vector.

The terms "active learning" or "supervised learning" may be used to refer to one or more machine-learning techniques for creating a function from training data. For example, training data may consist of pairs of input objects (typically vectors), and one or more desired outputs. The output of the function can be a continuous value (sometimes called "regression"), or can predict a class label of the input object (sometimes called "classification"). In some implementations, the task of a supervised learner may include predicting a value of a function for a valid input object after having seen a number of training examples (i.e. pairs of input and target output). To achieve this, the learner may generalize from the presented data to unseen situations in a "reasonable" way.

Finally, unless otherwise specified, the term "and/or" may be used herein to set forth possible, but not necessarily mutually exclusive, alternatives. For example, a phrase having the form "A and/or B" as used herein should be understood to include at least three possibilities (i.e. A, B, and "A and B"), while not necessarily excluding other possibilities (e.g. "A and C," "A and B and Z" "Z," etc.), unless otherwise specified.

Discussion of Exemplary Embodiments

Relatively constant environments, like well-defined industrial processes, typically benefit from sound control logic that provides clear operating envelopes and directly-measured key performance indicators. In accordance with the teachings of the present disclosure, however, advisory tools can be built for use in dynamic environments from consistent and redundant historical data and experience gathered, at least in part, using well-defined industrial processes.

As noted above, many processes, such as those involving oil and gas production, may face continuously changing environments. Changing variables in such dynamic environments (e.g. business and operational variables) involved in the production of oil and gas may involve relatively high uncertainties in the decision-making process, with less clear best practices and logic than other, relatively constant environments (e.g. well-defined industrial processes). Best practices can be difficult to apply to such dynamically-varying oil and gas production environments.

In at least some implementations, self-improving reasoning tools may be based on an integration of data-driven and model-driven tools, as well as expert reasoning tools, in order to improve operational processes (e.g. business and decision-making processes). Unsupervised data mining methods, such as self-organizing maps, can be used as data-driven modeling tools. Similarly, Bayesian networks may be suitable for knowledge-capturing or an expert reasoning part of integrating data-driven modeling and knowledge into a self-improving reasoning tool. In some implementations, for example, integrating data-driven modeling and knowledge into self-improving reasoning tools may overcome restrictions with regard to explaining results of self-organizing maps (e.g. black box SOM's). Similarly, active learning may be applied to link unsupervised training and expert reasoning. Methods and systems that integrate these technologies in accordance with the teachings of the present disclosure may advantageously leverage each technology's strengths while mitigating (or minimizing) each technology's weaknesses.

Hybrid artificial intelligence systems may feed into a catalog of proven cases derived from both business and operation data and expert knowledge. The case catalog may be used to train a Bayesian network to identify business opportunities triggered by events detected in business and operation data. In turn, recommendations based on expertise or modeling tools can be integrated in the decision making support. Stochastic modeling tools, such as experimental design, can make use of probability distribution information used in the Bayesian networks. After decisions have been made, actual performance may be compared against the expected improvement (e.g. optimization) provided by the recommendation, and the resulting effectiveness of decisions made may be captured and stored along with desired contextual information which occurred during the decision making and performance review processes. In further implementations, a second Bayesian network may be trained and updated automatically for further improved decision support.

For example, FIG. 1 illustrates a flowchart of an exemplary advisory process 100 in accordance with the teachings of the present disclosure. In this implementation, the advisory process 100 integrates data-driven modeling and knowledge to provide a self-improving reasoning tool. More specifically, in this implementation, the advisory process 100 includes an identifier component 102, a decision support component 104, and a capture component 106. The identifier component 102 may identify opportunities, including one or more types of business opportunities, operations opportunities, etc. The decision support component 104 may provide support for one or more appropriate actions (or decisions) to be taken in order to manage the business or operations opportunity in an improved (or optimized) way. And the capture component 106 may capture an effectiveness of the one or more appropriate actions (or decisions), and may integrate the effectiveness data into the process 100 (e.g. into the identifier component 102, the decision support component 104, or both) to improve the process 100 for performing future advisory support. Thus, in at least some implementations, processes in accordance with the teachings of the present disclosure may integrate data-driven modeling and knowledge into a self-improving reasoning tool that may overcome an inability of conventional processes to automatically learn from new data. Additional aspects and details of various implementations of the process 100 are described more fully below.

Figure 2:
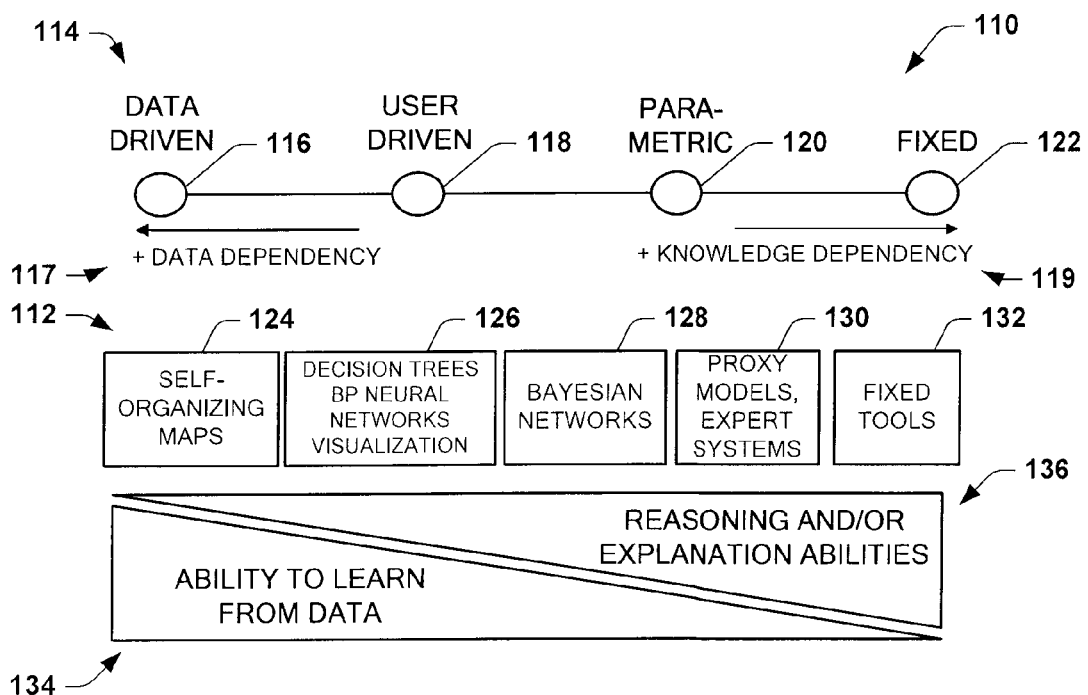
FIG. 2 is a schematic diagram of a range of decision advisory tools and associated characteristics.

FIG. 2 is a schematic diagram 110 of a range of decision advisory tools 112 and associated characteristics. As depicted by a data/knowledge dependency axis 114, the advisory tools 112 generally range from those having an increasing data-dependency 117 to those having an increasing knowledge dependency 119. The decision advisory tools 112 generally include a data-driven category 116 (toward the increasing data-dependency 117 portion of the data/knowledge dependency axis 114), a user-driven category 118, a parametric category 120, and a fixed category 122 (toward the increasing knowledge dependency-portion 119 of the data/knowledge dependency axis 114).

As further shown in FIG. 2, the decision advisory tools 112 may generally include self-organizing maps 124 (loosely associated with the data-driven category 116), a second set of tools 126 that may include decision trees, back-propagation (BP) neural networks, and visualization (loosely associated with the user-driven category 118), Bayesian networks 128 (loosely associated with the user-driven and parametric categories 118, 120, and a fourth set of tools 130 that may include proxy models and expert systems (loosely associated with the parametric category 120). Other tools 132 (e.g. fixed or static tools) may exist that are loosely associated with the fixed category 122.

FIG. 2 further depicts that the decision advisory tools 112 toward the increasing data-dependency portion 117 of the data/knowledge dependency axis 114 may generally have a relatively larger ability to learn from data 134 (e.g. "data mining") and relatively smaller reasoning and/or explanation abilities 136 (e.g. "expert modeling"). Conversely, the decision advisory tools 112 toward the increasing knowledge dependency end 119 of the data/knowledge dependency axis 114 may generally have relatively larger reasoning and/or explanation abilities 136 and a relatively smaller ability to learn from data 134.

Other characteristics of the decision advisory tools 112 may also be considered. For example, some experiences and circumstances have shown that rigorous expert systems 130 are typically time consuming to build and to maintain, and that the relative inability of such expert systems 130 to learn from data 134 may allow such systems to become outdated relatively quickly. On the other hand, the decision advisory tools 112 associated with the data driven category 116 may be relatively poor in reasoning ability 136. Expert systems 130 are typically hard to maintain by system users themselves, and experts may often be needed to update such systems. For example, changes in business environments may sometimes require experts to update expert business systems.

Furthermore, expert systems 130 and their Boolean logic may be overly brittle in changing business environment with higher uncertainties, such as businesses that involve the production of oil and gas. Fixed and parametric modeling approaches 122, 120 may be relatively weaker in the ability to learn from data 134, but may exhibit excellent reasoning and/or explanation abilities 136, while data-driven approaches 116 show a relatively greater ability to learn from data 134 but may show "black box" behavior. As noted above, the integration of multiple categories of decision advisory tools 112 into hybrid systems and processes in accordance with the teachings of the present disclosure may advantageously overcome the restrictions and weaknesses of each individual category.

Referring again to FIG. 1, in at least some implementations, the advisory process 100 includes a hybrid modeling approach. More specifically, the identifier component 102 may include data mining techniques 124, 126 (unsupervised and supervised) for learning from data, pattern recognition and clustering (e.g. self-organizing maps, decision trees, back-propagation neural networks, visualization, etc.). In addition, one or more of the identifier component 102 or the decision support component 104 may include a Bayesian network 128 for one or more of classification of events, validation, and diagnosis of an opportunity. In some implementations, the decision support component 104 may include a proxy model 130 for forecasting and optimization. Similarly, the capture component 106 may include a Bayesian network 128 or an expert system 130 for reviewing performance or providing recommendations.

Figure 3:
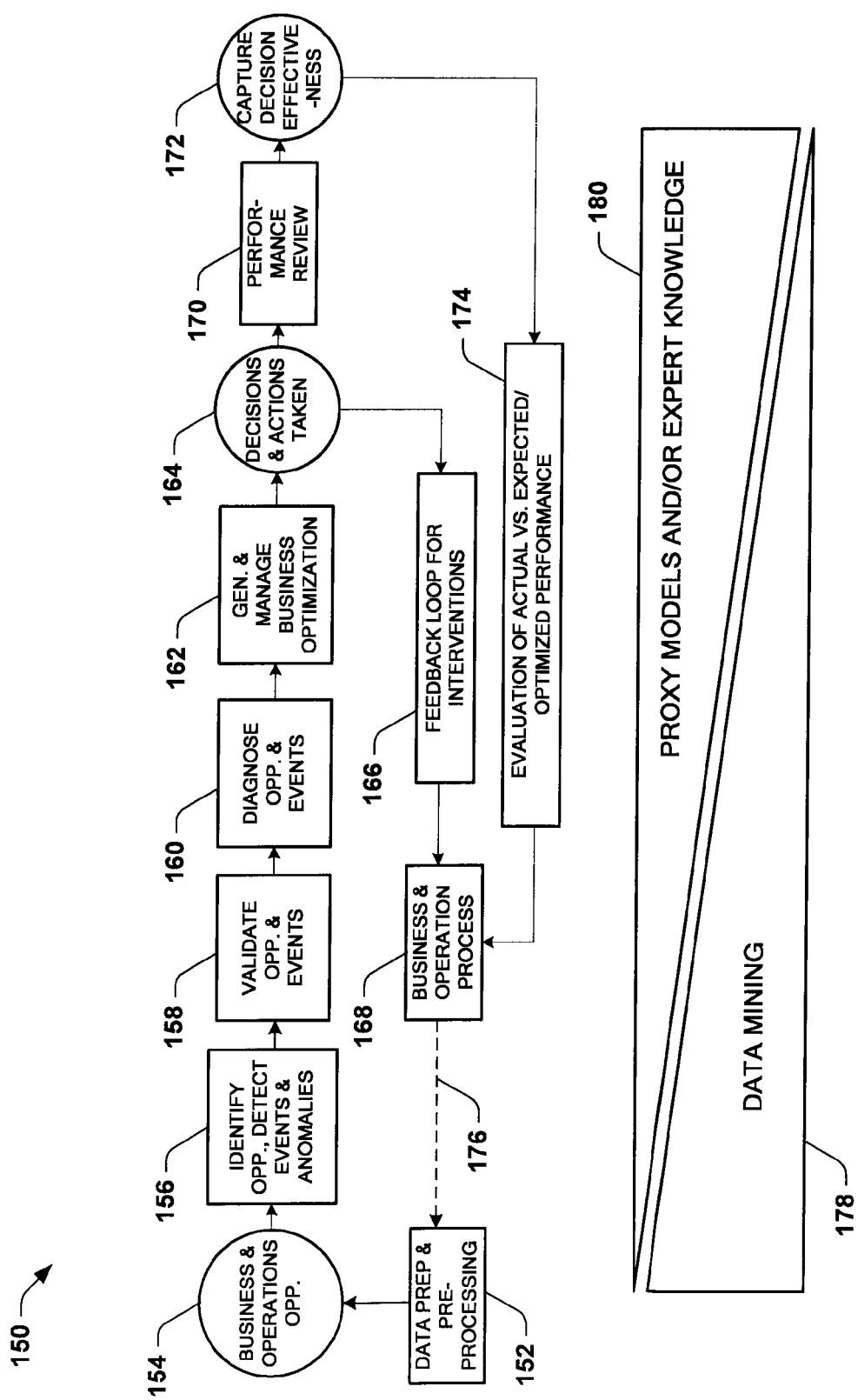
FIG. 3 shows a flowchart of another embodiment of a process in accordance with the teachings of the present disclosure.

FIG. 3 is a flowchart of a process 150 in accordance with the teachings of the present disclosure. It will be appreciated that although the implementation shown in FIG. 3 will be designated and described as being a "process," in alternate implementations, the depicted implementation may be implemented as a "system," "process," or any suitable combination thereof. Therefore, although implementations may be described throughout the present disclosure as being a "process" or a "system," such designations are intended to be interchangeable or combinable, and are not intended to be limiting or determinative of all possible implementations in accordance herewith.

In this implementation, the process 150 includes data preparation and pre-processing at 152. Output from the data preparation and pre-processing at 152 may be provided to an evaluation of a business and/or operations opportunity at 154. One or more of identification of an opportunity, detection of events, and/or detection of anomalies occurs at 156. At 158, validation of an opportunity and/or events occurs, and diagnosis of the opportunity and/or events occurs at 160. At 162, optimization of the business and/or operations opportunity is generated and/or managed.

As further shown in FIG. 3, one or more decisions and/or actions are taken at 164. A feedback loop occurs at 166 that provides information from the one or more decisions and/or actions taken at 164 to a business and/or operation process at 168. The feedback loop at 166 enables interventions into the one or more decisions and/or actions taken at 164, including, for example, a human expert override or other suitable intervening action. A performance review occurs at 170, and an effectiveness of the one or more decisions and/or actions is captured at 172. An evaluation of an actual performance versus an expected and/or an optimized performance occurs at 174. Output from the evaluation at 174 may be provided to the business and/or operations process 168 to improve performance of the current and/or future processes. Information from the business and/or operations process 168 (and any other desired portions of the process 150) may be provided via input 176 to the data preparation and pre-processing at 152 to improve on-going performance of the process 150. The process 150 may thus be repeated indefinitely in a closed (or partially-closed loop) fashion.

As further shown in FIG. 3, the various actions of the process 150 tend to vary in their relative proportions of capability (and/or dependency) on data mining 178 and proxy models and/or expert knowledge 180 (as described above with respect to the data/knowledge dependency axis 114 of FIG. 2). As visually depicted by FIG. 3, some portions of the process 150 may have a relatively larger capability to perform data mining 178 and a relatively smaller capability to perform expert modeling 180 (e.g. proxy models and/or expert knowledge).

Figure 4:
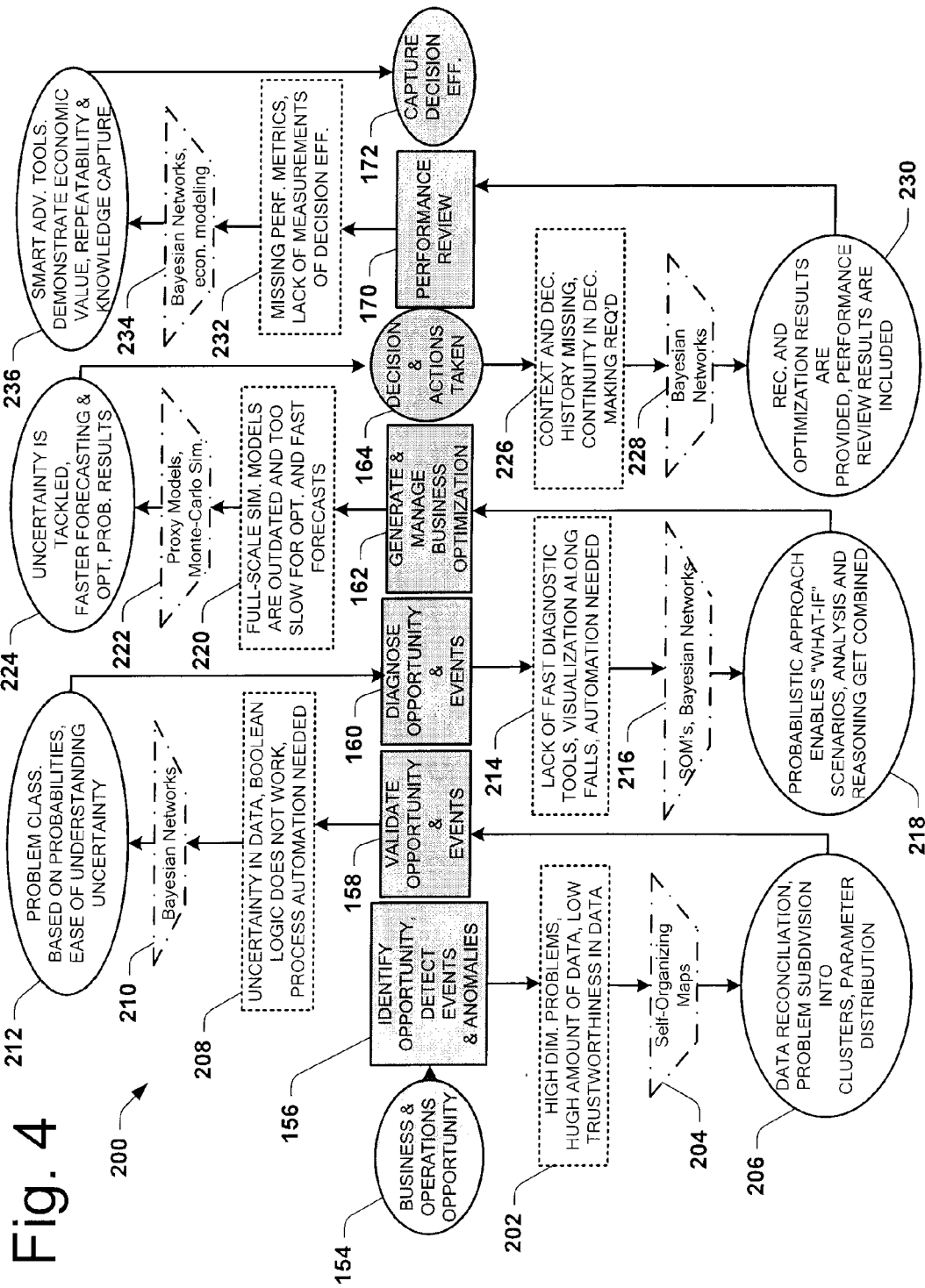
FIG. 4 shows an overview of some of the challenges and solutions that may be associated with at least some of the embodiments of systems and processes in accordance with the teachings of the present disclosure.

FIG. 4 shows an overview 200 of some of the challenges and/or solutions that may be associated with at least some of the various portions of systems and processes that integrate data-driven modeling and knowledge into self-improving reasoning tools, such as the process 150 of FIG. 3. For example, in some implementations, a challenge 202 that includes one or more of high dimensional problems, huge amount of data, and/or low trustworthiness of data may be associated with the one or more of identification of an opportunity, detection of events, and/or detection of anomalies at 156. In such implementations, a solution 204 may include one or more self-organizing maps, which may provide one or more of data reconciliation, problem subdivision into clusters, and/or parameter distribution at 206 to the validation of an opportunity and/or events at 158.

Similarly, in some implementations, a challenge 208 that includes one or more of uncertainty in data, Boolean logic difficulties (e.g. doesn't work), and/or process automation needed may be associated with the validation of an opportunity and/or events at 158. In such implementations, a solution 210 may include one or more Bayesian networks which may provide one or more of problem classification based on probabilities, ease of understanding uncertainty at 212 to the diagnosis of the opportunity and/or events at 160.

As shown in FIG. 4, in some implementations, a challenge 214 that includes one or more of lack of fast diagnostic tools, visualization along falls, and/or lack of automation may be associated with the diagnosis of the opportunity and/or events at 160. In such implementations, a solution 216 may include one or more self-organizing maps and Bayesian networks which may provide one or more of a probabilistic approach that enables "what-if" scenarios, and/or an improved combination of analysis and reasoning at 218 to the optimization of the business and/or operations opportunity generated and/or managed at 162.

In further implementations, a challenge 220 may include one or more of full-scale simulation models that may be outdated and/or too slow for optimization and fast forecasts may be associated with the optimization of the business and/or operations opportunity generated and/or managed at 162. In such implementations, a solution 222 may include one or more proxy models and Monte-Carlo simulations, which may provide one or more of improved handling of uncertainties, faster forecasting and optimization, and probabilistic results at 224 to the one or more decisions and/or actions taken at 164.

Similarly, a challenge 226 may include one or more of missing context and/or decision histories, and consistency in decision-making requirements may be associated with the one or more decisions and/or actions taken at 164. In such implementations, a solution 228 may include one or more Bayesian networks, which may provide one or more of improved provision of recommendations and optimization results and may include performance review results at 230 to the performance review performed at 170.

As further shown in FIG. 4, in some implementations, a challenge 232 that includes one or more of missing performance metrics, and lack of measurements of decision effectiveness may be associated with the performance review performed at 170. In such implementations, a solution 216 may include one or more Bayesian networks and economical models, which may provide one or more of smart advisory tools that demonstrate economic value, repeatability, and knowledge capture at 236 to the capturing of the decision effectiveness at 172.

Thus, it will be appreciated that implementations of processes and systems in accordance with the teachings of the present disclosure may overcome at least some of the restrictions associated with the prior art by integrating various different modeling approaches. For example, in some implementations, Self-Organizing Maps (e.g. at 204) may perform data reconciliation and back-population routines that provide data of improved trustworthiness. Similarly, clustering techniques may determine significant clusters of patterns, may reduce search space complexity of possible solutions, and may provide parameter distributions for detected clusters. In some implementations, Bayesian networks (e.g. at 210) may handle uncertainty in data and may provide robust problem classification, while Self-Organizing Maps and Bayesian networks (e.g. at 216) may advantageously enable so-called "What-If" scenarios and may combine analysis and reasoning. In still further implementations, probabilistic and stochastic modeling using approaches like proxy modeling and Monte-Carlo simulation (e.g. at 222) may enable faster forecasting and optimization, while Bayesian networks (e.g. at 228) may enable advisory systems and methods (e.g. so-called "Smart Advisors") to be based on historic cases and captured knowledge. In some implementations, Bayesian networks and economical modeling (e.g. at 234) may demonstrate economic value and enable repeatability and knowledge capture.

Figure 5:
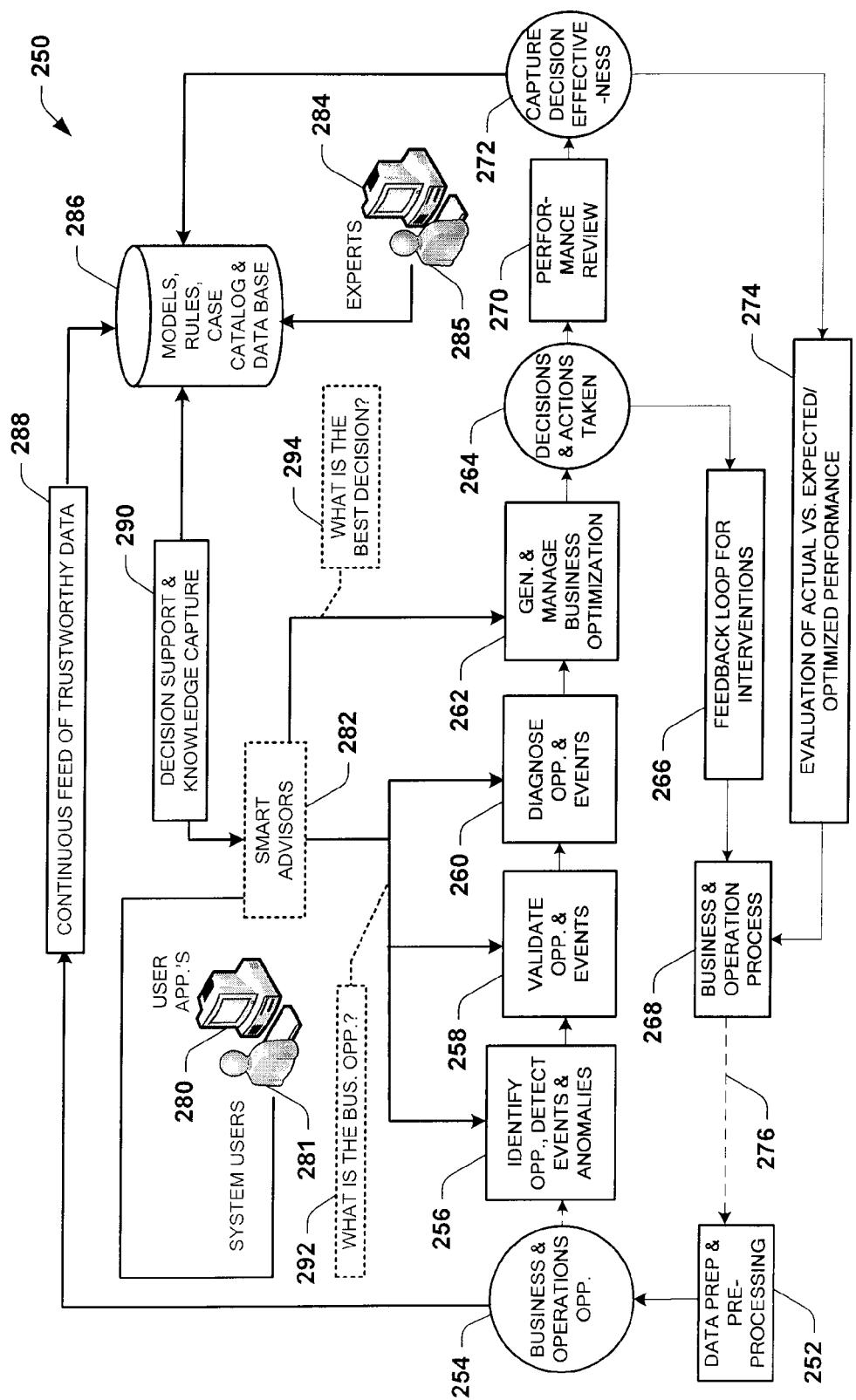
FIG. 5 is an embodiment of a system in accordance with the teachings of the present disclosure.

A variety of implementations of systems may be conceived in accordance with the teachings of the present disclosure. In some implementations, such systems may include components which perform operations substantially similar to those described above with reference to FIG. 3. For example, FIG. 5 is an embodiment of a system 250 in accordance with the teachings of the present disclosure. In this implementation, the system 250 includes a data preparation and pre-processing component 252. Output from the data preparation and pre-processing component 252 may be provided to an evaluation component 254 that is configured to evaluate a business and/or operations opportunity. A detection component 256 is configured to perform one or more of identification of an opportunity, detection of events, and/or detection of anomalies. Similarly, a validation component 258 is configured to validate an opportunity and/or event, and a diagnosis component 260 is configured to diagnose the opportunity and/or event.

As further shown in FIG. 5, the system 250 further includes an optimization component 262 configured to at least one of generate and/or manage an optimization of the business and/or operations opportunity. A decision component 264 is configured to initiate one or more decisions and/or actions, and a feedback component 266 is configured to provide information from the decision component 264 to an implementation component 268 that is configured to implement at least a portion of a business and/or operation process. The feedback component 266 may enable interventions into the operations performed by the decision component 264, including, for example, a human expert override or other suitable intervening action. A performance review component 270 is configured to perform a review of a performance of operations performed by the decision component 264, and a capture component 272 is configured to capture an effectiveness of the one or more operations reviewed by the performance review component 270. An evaluation component 274 is configured to evaluate an actual performance versus an expected and/or an optimized performance, and to provide output to the implementation component 268 to improve performance of the current and/or future processes. In turn information from the implementation component 268 (and any other desired components of portions of the system 250) may be provided via communication link 276 to the data preparation and pre-processing component 252 to improve on-going performance of the system 250.

As shown in FIG. 5, in this implementation, the system 250 further includes at least one user interface 280 (e.g. personal computer, laptop, workstation, handheld device, keyboard, mouse, microphone, etc.) that enables a system user 281 to operate one or more advisor components (or "smart advisors") 282 via one or more user applications. Similarly, at least one expert interface 284 (e.g. personal computer, laptop, workstation, handheld device, keyboard, mouse, microphone, etc.) enables one or more experts 285 to provide input to a knowledge database 286. The knowledge database 286 may include, for example, one or more models, rules, cases, case catalogs, summaries, historical information, simulation data, empirical data, or any other suitable information. A data feed component 288 is configured to provide a feed of trustworthy information (continuous or non-continuous) from the evaluation component 254 to the knowledge database 286, while a support and capture component 290 is configured to communicate information between (to and/or from) the knowledge database 286 to the one or more advisor components 282.

In operation, an event data may be provided via the user interface 280 to the one or more advisor components 282. The one or more advisor components 282 may in turn provide the event data to other components of the system 250 for an evaluation and/or determination of a potential business opportunity 292. As shown in FIG. 5, the one or more advisor components 282 operatively communicate the event data with one or more of the detection component 256, the validation component 258, and the diagnosis component 260. As noted above, the detection component 256 performs one or more of identification of an opportunity, detection of events, and/or detection of anomalies. The validation component 258 may validate an opportunity and/or event, and the diagnosis component 260 may diagnose the opportunity and/or event.

Based on the operations of the one or more of the detection, validation, and diagnosis components 256, 258, 260 (described above), the one or more advisor components 282 initiates an evaluation and/or determination of a "best" or "recommended" business decision 294. More specifically, the one or more advisor components 282 operatively communicate with the optimization component 262 which, in turn, generates and/or manages an optimization of the business and/or operations opportunity. The decision component 264 initiates one or more decisions and/or actions in accordance with information from the optimization component 262.

The feedback component 266 provides information from the decision component 264 to the implementation component 268, which implements at least a portion of a business and/or operation process. The performance review component 270 monitors at least part of the performance of operations performed by the decision component 264, and the capture component 272 captures an effectiveness of the one or more operations reviewed by the performance review component 270. Information from the capture component 272 may be provided directly back to the knowledge database 286, or may be provided via the implementation component 268 (and evaluation component 274) to the data preparation and pre-processing component 252, and other system components as depicted in FIG. 5.

Figure 6:
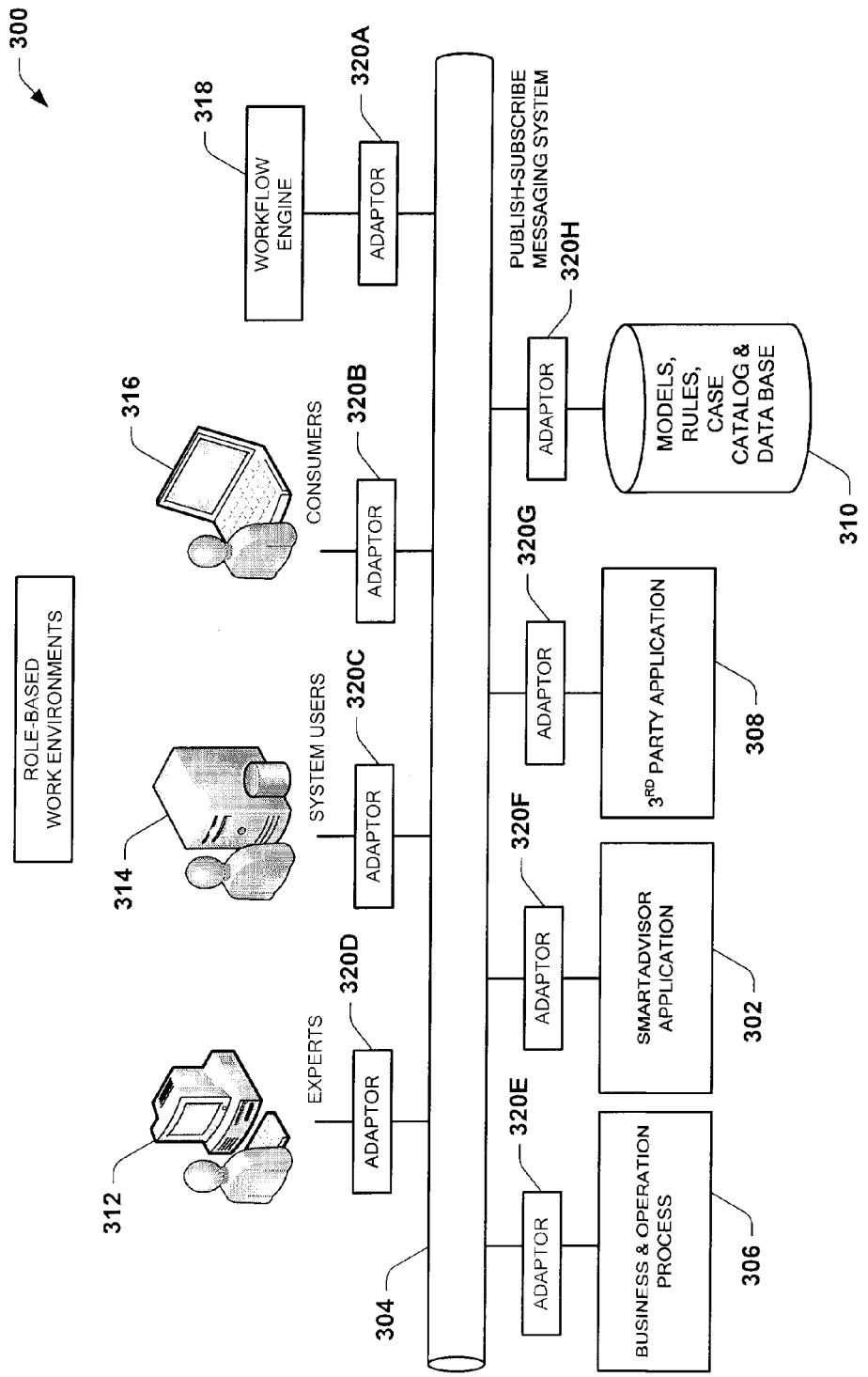
FIG. 6 is another embodiment of a system in accordance with the teachings of the present disclosure.

FIG. 6 is another embodiment of a system 300 in accordance with the teachings of the present disclosure. In this implementation, the system 300 (or one or more components thereof) is configured using a software architecture following the principles of a Service Oriented Architecture (SOA), which may provide additional benefits from flexible scalability with regard to system users.

The system 300 includes a smart advisor application 302 which implements one or more systems or methods having integrated data-driven modeling and knowledge aspects in accordance with the teachings of the present disclosure, including for example, the systems (e.g. system 250, etc.) and/or methods (e.g. method 100, method 150, etc.) described above with reference to FIGS. 1-5. The smart advisor application 302 is coupled to a communication network 304 (e.g. internet, intranet, wired or wireless network, etc.) and operatively communicates with one or more of a business and operation process 306, a third-party application 308, and a database 310. In a particular implementation, the communication network 304 may be a subscription-only system that limits access to one or more of the components (or various portions) of the system 300 to authorized subscribers.

As further shown in FIG. 6, one or more expert interfaces 312, user interfaces 314, and consumer interfaces 316 may also be coupled to the communication network 304. A workflow engine 318 may operatively communicate with the other components of the system 300 via the communication network 304. Each of the components of the system 300 (e.g. workflow engine 318, interfaces 316, 314, 312, database 310, and other components 308, 306, 302) may communicate through the communication network 304 through one or more adaptors 320 configured to facilitate communications using, for example, communication translation protocols and the like.

Using the expert interface 312, an expert may provide suitable information, logic, and data to the system 300, including providing updates to the database 310 or the components of the smart advisor application 302. Using the user interface 314 (or the consumer interface 316), a user (or consumer) may operate the smart advisor application 302 to perform any of the desired functionalities described above, including but not limited to identifying suitable business or operations opportunities, determining recommended decisions or courses of action, or evaluating and capturing decision effectiveness for improving on-going or future decision making applications.

In some implementations, the workflow engine 318 may coordinate services provided by the system 300, and may handle automation and data management activities within the system 300, as well as perform communications with external systems. In still other implementations, the workflow of the system 300 may be scheduled, or triggered by events (e.g. by a user or consumer providing event data via an interface 314, 316). The system 300 may be configured to allow the operation of several workflows in parallel (e.g. using known parallel processing or shared resource techniques).

It will be appreciated that business logic implemented by or within one or more components of the system 300 may be customizable, and the degree of automation can be changed with time. Rapid changes in business and operation conditions might lead to taking the system 300 offline as updating of the system 300 and/or system components (e.g. database 310, smart advisor application 302, etc.) becomes desirable. Once the conditions are stable again and models and/or information are updated, the workflow can be automated again.

A closed loop control of business and operation processes can be achieved in some implementations such as, for example, when the workflow is largely or entirely automated, including the initiation of activities (e.g. sending calculated setpoints to the process, such as to conduct parametric studies). The different types of users, experts, system users, consumers, administrators etc., may be working in a variety of role-based environments depending on their intended role or usage of the system 300.

Figure 7:
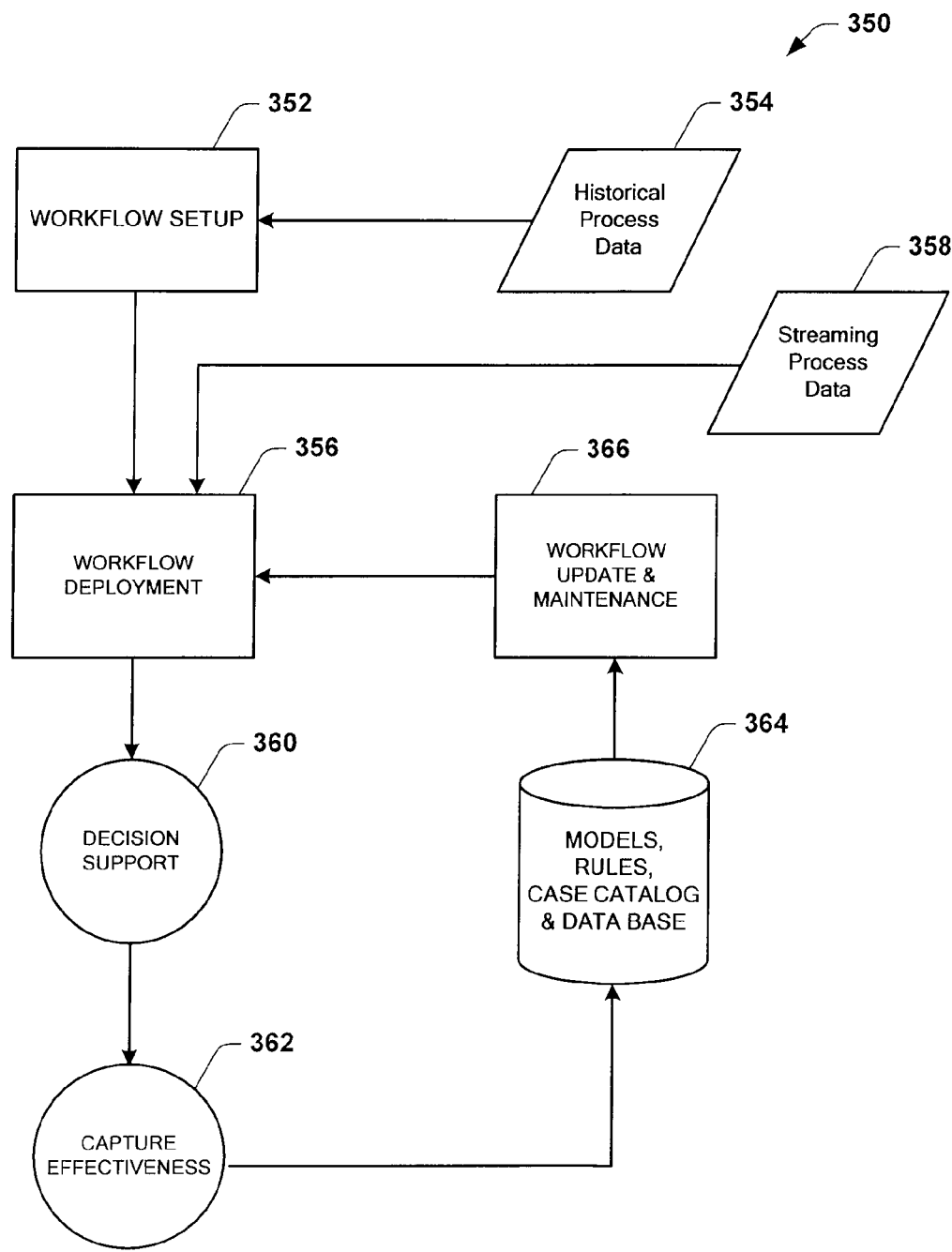
FIG. 7 is another embodiment of a process in accordance with the teachings of the present disclosure.

In some implementations, the workflow within systems and processes in accordance with the present disclosure may be initially setup using historical data, and thereafter, streaming data may be used in a deployment mode (during actual operations). For example, FIG. 7 is another implementation of a process 350 in accordance with the teachings of the present disclosure. In this implementation, a workflow setup 352 occurs using historical process data 354. As workflow deployment 356 occurs, streaming process data 358 is provided to the on-going workflow deployment 356. Decision support 360 is provided, and decision effectiveness is captured 362, using one or more of the above-described functionalities. A knowledge database 364 may be updated using the captured decision effectiveness 362, and if needed or desired, workflow updates and/or maintenance 364 may be performed and fed back to the on-going or future workflow deployment 356. Thus, results of the workflow deployment 356 may be continuously (or non-continuously) captured and used to improve the reasoning models. As noted above, changing business and operation conditions might require a re-training and update of the models, database, or other components of the process 350. For example, in situations that cause "best" or "recommended" practices to change, the workflow deployment 356 may be updated accordingly.

As previously noted, Bayesian networks can be used in integrating data-driven modeling and knowledge into a self-improving reasoning tools in accordance with the teachings of the present disclosure. It will be appreciated that Bayesian networks employed in various implementations in accordance with the present disclosure may assume a variety of forms and compositions. For example, in some implementations, Bayesian networks are graphical models representing a set of variables and their probabilistic dependencies. Such Bayesian networks may be utilized to predict the probability of different events happening by observing a certain set of data which might be either complete or incomplete enabling reasoning under uncertainty.

In further implementations, Bayesian networks may be directed acyclic graphs whose nodes represent variables, and whose arcs encode conditional dependencies between the variables. Nodes can represent any kind of variable, be it a measured parameter, a latent variable or a hypothesis. It will be appreciated that Bayesian networks need not be restricted to representing random variables, which forms the "Bayesian" aspect of a Bayesian network. Efficient algorithms exist that perform inference and learning in Bayesian networks. Bayesian networks that model sequences of variables are typically called dynamic Bayesian networks, and these may also be employed in some implementations of systems and processes in accordance with the present disclosure. Generally speaking, in some implementations, compared with other machine learning algorithms. Bayesian networks achieve good performance, but may provide an advantage of being human understandable. For example, in some Bayesian networks, the network architecture and the way variables depend on each other can be visualized and readable by humans, and similarly, may be interpreted and validated by humans. In contrast, other algorithms (e.g. neural networks) may be less readable or interpretable, and more "black-box" style for the user.

It will also be appreciated that, in various implementations, Bayesian networks can be constructed in different ways in integrating data-driven modeling and knowledge into a self-improving reasoning tools. One general example is an expert-driven Bayesian network. In at least some expert-driven Bayesian networks, the complete network, including the variables and their dependencies, as well as the probabilities of these dependencies, are constructed by an expert of the domain, using his or her knowledge and experience. In other words, the expert may define the architecture and the probabilities of the network. This approach is generally more feasible when the number of networks needed is small, and the probabilities can be observed and are not changing.

In various other implementations, machine learning may be employed. In such implementations, the architecture of the network and the dependencies probabilities may be partially or completely learned by a machine-learning algorithm. Typically, a machine-learning algorithm requires training data (i.e. a number of inputs that have been designated to belong to a specific class). For example, this could be data about one or more symptoms of patients, and the information whether the patients are in fact having a disease or not. This approach may be suitably appropriate if there is no knowledge about the dependencies variables available.

Further implementations may employ a combination of expert-driven and machine-learning algorithms. In such a combined approach, the expert of the domain may model an architecture of a network (i.e. the dependencies of the variables). The probabilities of the dependencies may then be learned from training data with a machine-learning algorithm. Such combined approaches may be suitably appropriate when the dependencies of the variables are known, but the exact probabilities are not explicit.

Figure 8:
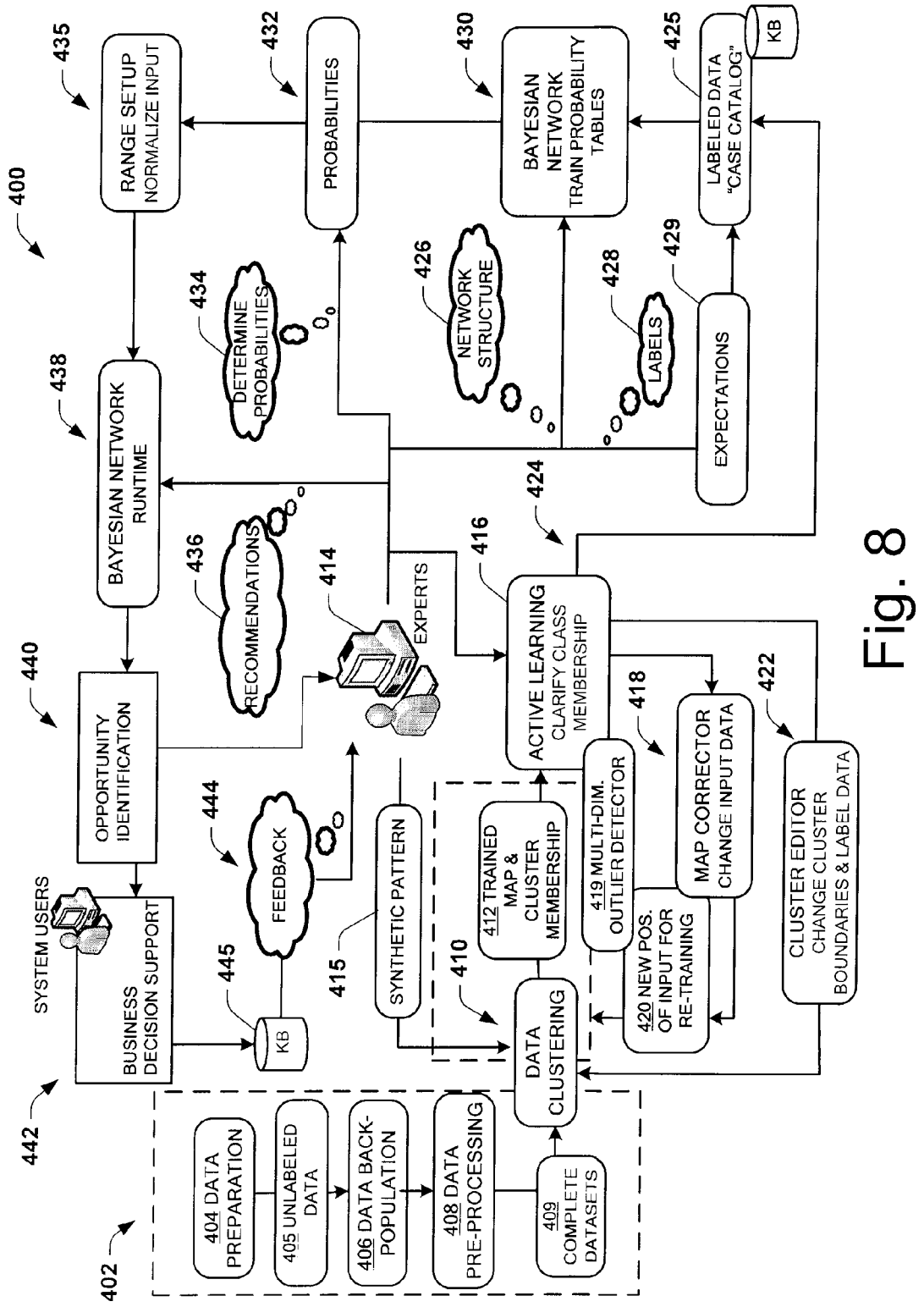
FIG. 8 is another embodiment of a system in accordance with the teachings of the present disclosure.

FIG. 8 is another embodiment of a system 400 in accordance with the teachings of the present disclosure. As noted above, although the implementation shown in FIG. 8 will be described as being a "system" rather than a "process," such designations are intended to be interchangeable or combinable, and are not intended to be limiting or determinative of all possible implementations in accordance herewith.

In this implementation, the system 400 includes a data integration portion 402. The data integration activities performed by the data integration portion 402 may occur at the beginning of a workflow cycle, both at setup and at runtime. The data integration portion 402 may involve one or more of data preparation 404, handling of unlabeled data 405, data back-population 406, data pre-processing 408, and providing complete data sets 409. More specifically, during data preparation 404, model data may be converted to quality controlled parameters. During unlabeled data handling 405, data lacking any appropriate designations or labels may be provided therewith. During data back-population 406, data may be reconciled and back-populated in order to fill gaps in patterns. Pre-processing data 408 may include altering data in order to provide more suitable (or optimal) input for applied models.

Overall, the data integration portion 402 may cleanse and prepare an incoming data stream (e.g. real-world data stream) into complete data sets 409 which are suitably similar (in format, etc.) to the training and testing patterns and/or data for use by the models and components of the system 400. The data integration portion 402 may also convert predicted or transformed values from the models and components of the system 400 back into real-world values. The complete data sets 409 are then provided to a data clustering portion 410 of the system 400, as described more fully below.

In some implementations, the data integration portion 402 may be configured to operate in an automated fashion. This may be particularly desirable for environments involving non-stationary time-series data (e.g. oil and gas production data) that may include evolving trends and populations that may benefit from (or require) special data preparation and pre-processing methods. For example, data can be reduced stepwise while the data quality increases, as data with a certain frequency (e.g. every 10 seconds) may not be useable or feasible for real-time decision making purposes. Furthermore, various features may be required to manage the multi-frequency and variable nature of certain data (e.g. reservoir surveillance data).

Figure 9:
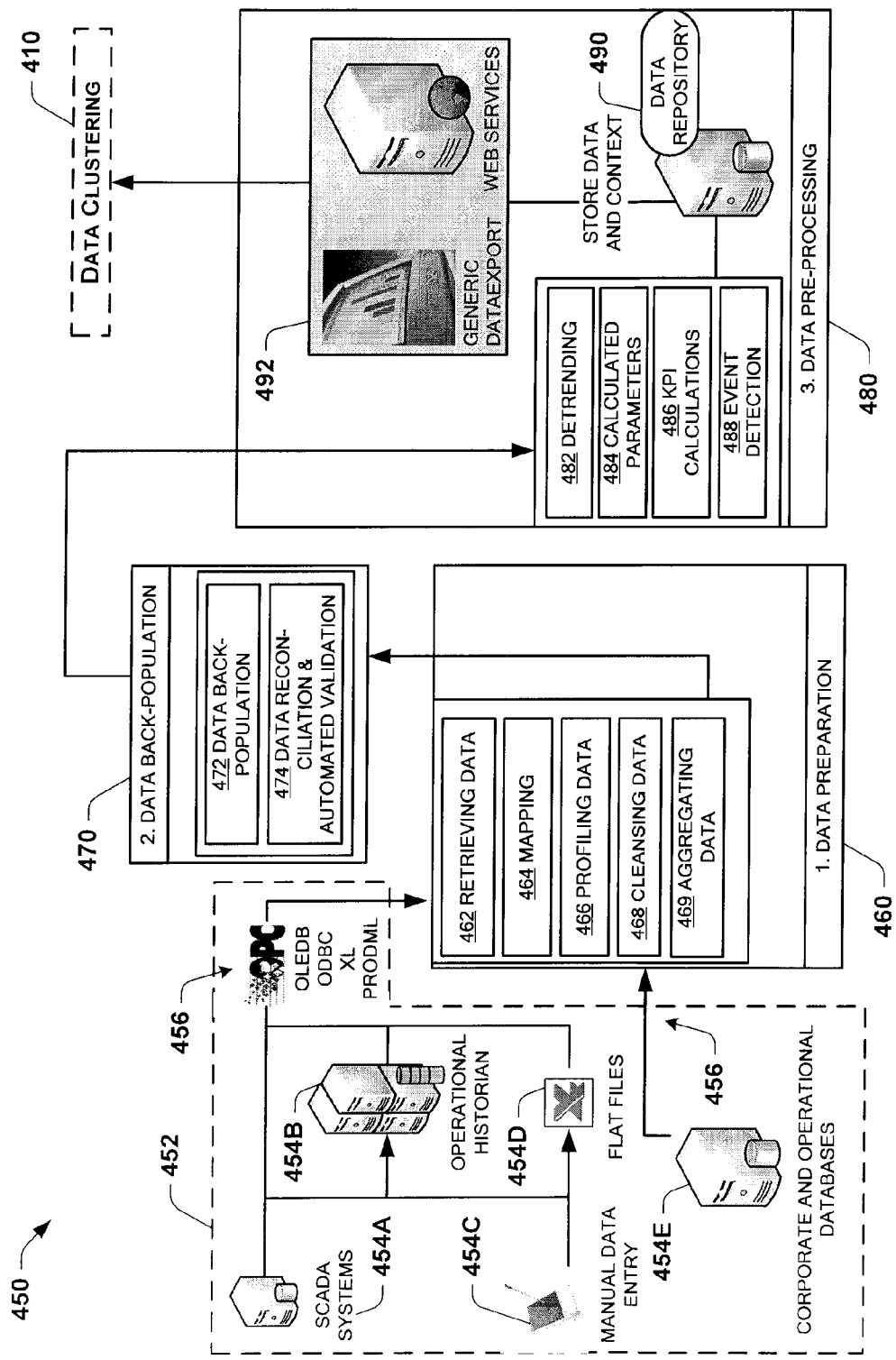
FIG. 9 is a schematic view of an implementation of an automated data integration system in accordance with the teachings of the present disclosure.

For example, FIG. 9 is a schematic view of an implementation of an automated data integration system 450 in accordance with the teachings of the present disclosure. The automated data integration system 450 may be included, for example, within the data integration portion 402 of the system 400 of FIG. 8. In this implementation, the automated data integration system 450 includes a data source portion 452, a data preparation portion 460, a data back-population portion 470, and a data pre-processing portion 480 that ultimately provides the resulting processed data sets. (e.g. to the data clustering portion 410 of the system 400 of FIG. 8).

In the implementation shown in FIG. 9, the data source portion 452 includes a plurality of data sources 454. More specifically, the data source portion 452 includes one or more of a Supervisory Control And Data Acquisition (SCADA) systems 454A (e.g. like those SCADA systems commercially-available from Lee-Dickens Ltd. of Kettering, U.K.), an operational historian component 454B (e.g. like those components commercially-available from Lee-Dickens Ltd. of Kettering, U.K.), a manual entry device 454C (e.g. cell phone, palmtop or hand-held computer, Personal Data Assistant, etc.), a data file (e.g. text file, image file, spreadsheet file, ASCI, HTML, machine-readable, etc.), or a corporate or operational database (or server) 454E.

Source data 456 provided by the various data sources 454 to the data preparation portion 460 may be provided in any suitable form, including but not limited to Object Linking and Embedding Database (OLEDB) data. Open Database Connectivity (ODBC) data, OLE for Process Control (OPC), XL data, Production Markup Language data (PRODML), or many other suitable data forms. The source data 456 may be based on or may include empirical data, semi-empirical data, simulation or analytically-derived data, or any other suitable data types.

In some implementations, the data preparation portion 460 may provide one or more of the following functionalities: retrieving the data from the data source portion 452 at 462, mapping of at least part of the data at 464, profiling of at least part of the data at 466, cleansing of at least part of the data at 468 (e.g. applying rules, filters, etc.), aggregating of at least part of the data at 469, or any other suitable data-related operations. Results of the operations of the data preparation portion 460 are then provided to the data back-population portion 470.

In some implementations, the data back-population portion 470 may perform data back-population at 472 to fill in missing data into the database as needed, and may reconcile and/or validate measured data with, for example, prior knowledge about a behavior of a process at 474. In at least some implementations, the behavior of a process may be described by a single model or a series of models. Similarly, the data reconciliation at 474 may be applied to perform one or more of adjusting measured data, or giving estimates to unmeasured variables where possible, in such a way that a set of measured and/or estimated data may satisfy energy and material balance equations. In further implementations, the data reconciliation at 474 may also identify erroneous measurements and/or locate inaccurate instruments. The data reconciliation at 474 may also turn real time process data that are subject to error (e.g. random error, gross error, etc.) into consistent and reliable information. Data reconciliation at 474 may also take advantage of one or more redundant equations, and may, in at least some implementations, minimize a sum of errors (e.g. a difference between each measured data and its reconciled value) weighted by a standard deviation of a measurement, subject to a number of constraints (the balance equations). In some implementations, one or more neural networks may be used as unbiased estimators for providing missing data, and may preserve characteristics of the values present when the estimates are included with the existing values. Statistically, an unbiased estimator may produces an estimate whose "expected" value is a value that would be estimated from the population. Self-Organizing Maps (SOMs) may also be used as stable estimators. Such estimators may also help to detect corrupted data, as they use a set of (redundant) input parameters and compare consistency between these parameters while doing the estimation. Furthermore, estimators may also provide a probability distribution function for one or more (e.g. all) data points.

As further shown in FIG. 9, the data pre-processing portion 480 may include de-trending at 482 and calculating parameters at 484. The de-trending and parameter calculations 482, 484 may be used to compute Key Performance Indicators (KPI) of the business and operation process at 486 (e.g. downtime). Events may also be detected at 488. The pre-processed data resulting from one or more of these functionalities may then be stored along with corresponding context information within a data repository 490, and/or the results (e.g. the complete data sets 409 of FIG. 8) may be provided at 492 from the automated data integration system 450 to other components (e.g. the data clustering portion 410 of FIG. 8). In some implementations, the provision of the pre-processed data at 492 may occur as a generic data export, as a web service, or in any other suitable manner.

Referring again to FIG. 8, in this implementation of the system 400, complete data sets 409 are provided by the data integration portion 402 to the data clustering portion 410. At 412, map training and cluster membership determinations may be performed. One factor for training reliable reasoning tools, such as the training of a Bayesian network during map training at 412, is providing good quality and quantity of training data for the network to learn. In some implementations, the provision of suitable training data can be achieved by manually labeling a rather large amount of data, which may be relatively tedious and time consuming. In further implementations, the provision of suitable training data may occur in a semi-automated fashion.

For example, in some implementations, a semi-automatic approach for providing suitable training data includes using one or more Self-Organizing Maps (SOM). The SOM may be an unsupervised machine learning algorithm, where unlabeled data may be organized into clusters of similar objects (i.e. providing a kind of clustering of the data). In the semi-automatic approach, an expert 414 may provide a synthetic pattern 415 which may define how many different classes of patterns are presumed to be present in the data. The data clustering portion 410 may then train and cluster at 412 an SOM of the data with the same number of classes identified in the synthetic pattern 415.

After the unsupervised training and clustering actions at 410, 412, an active learning portion 416 receives the output, and an expert 414 may review and refine the cluster assignments, and may assign to each of the problem classes defined in the synthetic pattern 415 a corresponding one or more of the clusters identified by the SOM. In at least some implementations, the expert 414 may use an interface (e.g. an input/output device) to provide knowledge inputs via an interactive wizard that operates on the interface.

After the assignments, at least two approaches may be used, either singly or in combination, to clarify class membership during the active learning portion 416. In a first approach, the data grouped into the clusters may be assumed to be labeled as belonging to that specific class and reliable, and can therefore be directly used as training data for a Bayesian network. In a second approach, not all data objects in the clusters are treated the same. Specifically, the data closest to cluster centroids may be regarded as reliable and can be used right away, while objects on the cluster boundaries may be interactively presented to the expert 414 for confirmation, and may be treated especially as data points helping to shape the decision boundaries (i.e. they could have a higher impact in the learning process). In some implementations validation of these approaches may be performed during the active learning 416 by comparing the results of these approaches with benchmark data (e.g. completely manually-labeled data).

As further shown in FIG. 8, in some implementations, the output of the active learning portion 416 may be provided to a map corrector portion 418 that may further improve the classification of input patterns. In the map corrector portion 418, a user might correct the SOM results (e.g. map pattern) directly. In some implementations, the map corrector portion 424 may access a multi-dimensional outlier detector 419 to identify candidate data for possible correction, and may provide new positions of input for re-training at 420.

Figure 10:
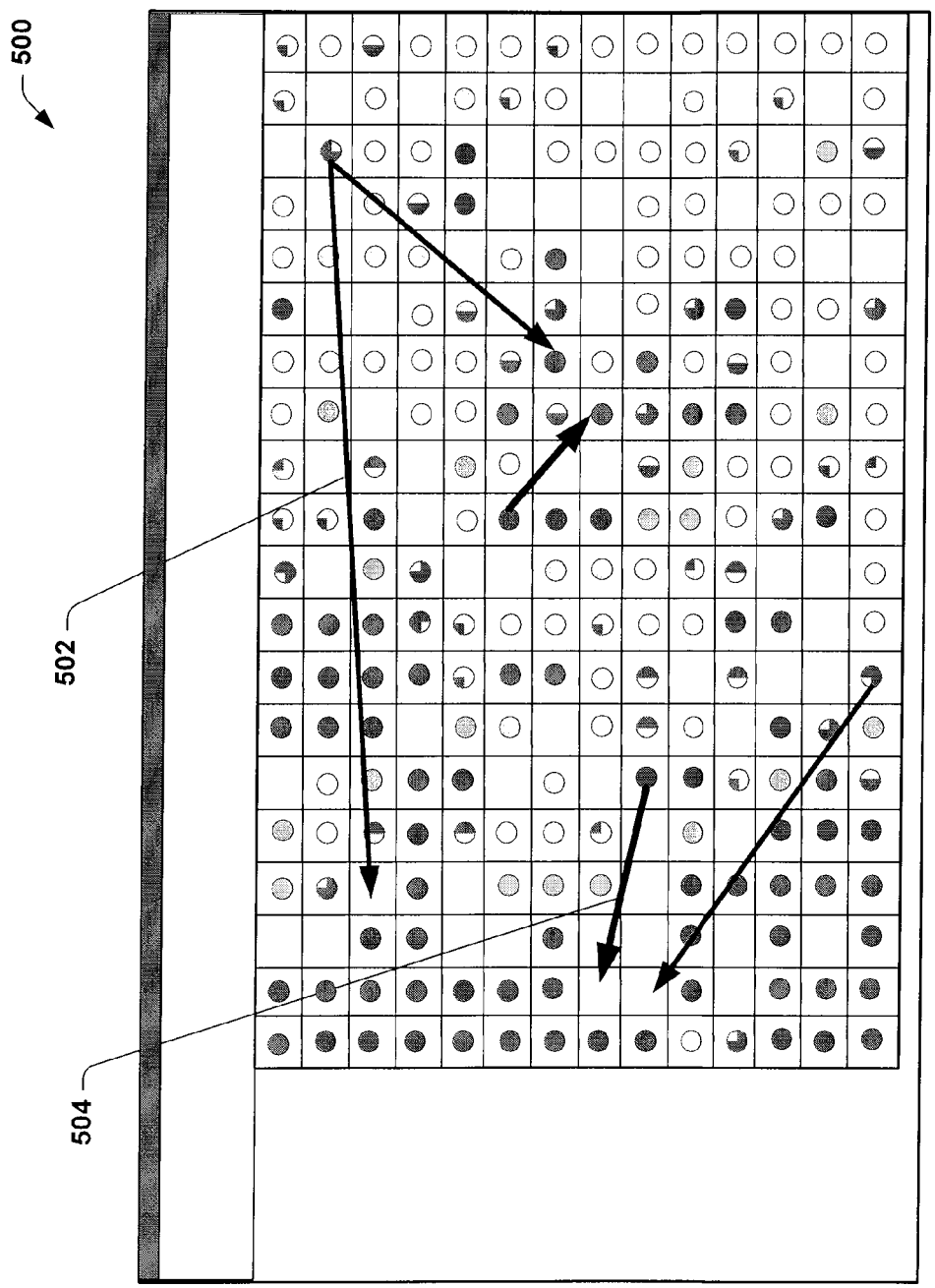
FIG. 10 shows a representation of a map pattern that may be corrected by a map corrector portion in accordance with the teachings of the present disclosure.

For example, FIG. 10 shows a representation (e.g. a computer screen shot) of a map pattern 500 that may be corrected by the map corrector portion 418 in accordance with the teachings of the present disclosure. As shown in this representation 500, a position of data within the map pattern 500 can be modified (e.g. at 502, 504). Such modifications can have a global or more local impact, and may optionally even require full re-learning (e.g. the features may be re-weighted) or may employ more localized adaptation. It will be appreciated that the functionalities of the map corrector portion 418 may be applied to a wide variety of SOM maps, whatever they represent, if a user is able to provide feedback for correcting the map. In addition, in some implementations, the functionalities of the map corrector portion 418 may be said to involve semi-supervised learning, in that the map corrector portion 418 "adds" some human supervision to an originally unsupervised method, and active learning, in that supervisory feedback from the user (or expert) may be involved.

Referring again to FIG. 8, in this implementation, the system 400 may further include a cluster editor portion 422. The cluster editor portion 422 may provide an expert 414 (or user) an opportunity to manually modify one or more cluster assignments (and/or data labels) of one or more data points. For example, in some implementations, the expert may graphically readjust one or more cluster boundaries on a visual representation of a multi-dimensional dataset (e.g. in a Self Organizing Map, multi-dimensional cross-plot, time series plot, etc.). The one or more cluster boundaries may be modified, for example, by moving a cluster boundary, or by selecting a group of data points (e.g. with a bounding polygon in a cross-plot, highlighting various sequences or events on a time series plot, etc.), which may then be grouped as a new cluster, or merged to one or more existing clusters. Hence, an expert may exercise the option to either modify a current cluster based on a previous clustering task, or to introduce one or more new clusters.

As depicted in FIG. 8, the output from the map corrector portion 418 (and re-training 420) and the cluster editor 422 may be fed back to the data clustering portion 410, and one or more of the above-described activities 410-422 may be repeated until results satisfactory to the expert 414 (or other user) have been achieved. When satisfactory results are achieved, the expert 414 may generate synthetic cases at 424 which may be added to a case catalog 425. In addition, such synthetic cases may also be used as input to the SOM model. Labeling of the data may be performed by the expert 414 prior to addition to the case catalog 425. In at least some implementations, unlabeled patterns are not taken into account in the case catalog 425. The case catalog 425 may be stored in a database (e.g. a Knowledge Base (KB)) as contextual information.

Figure 11:
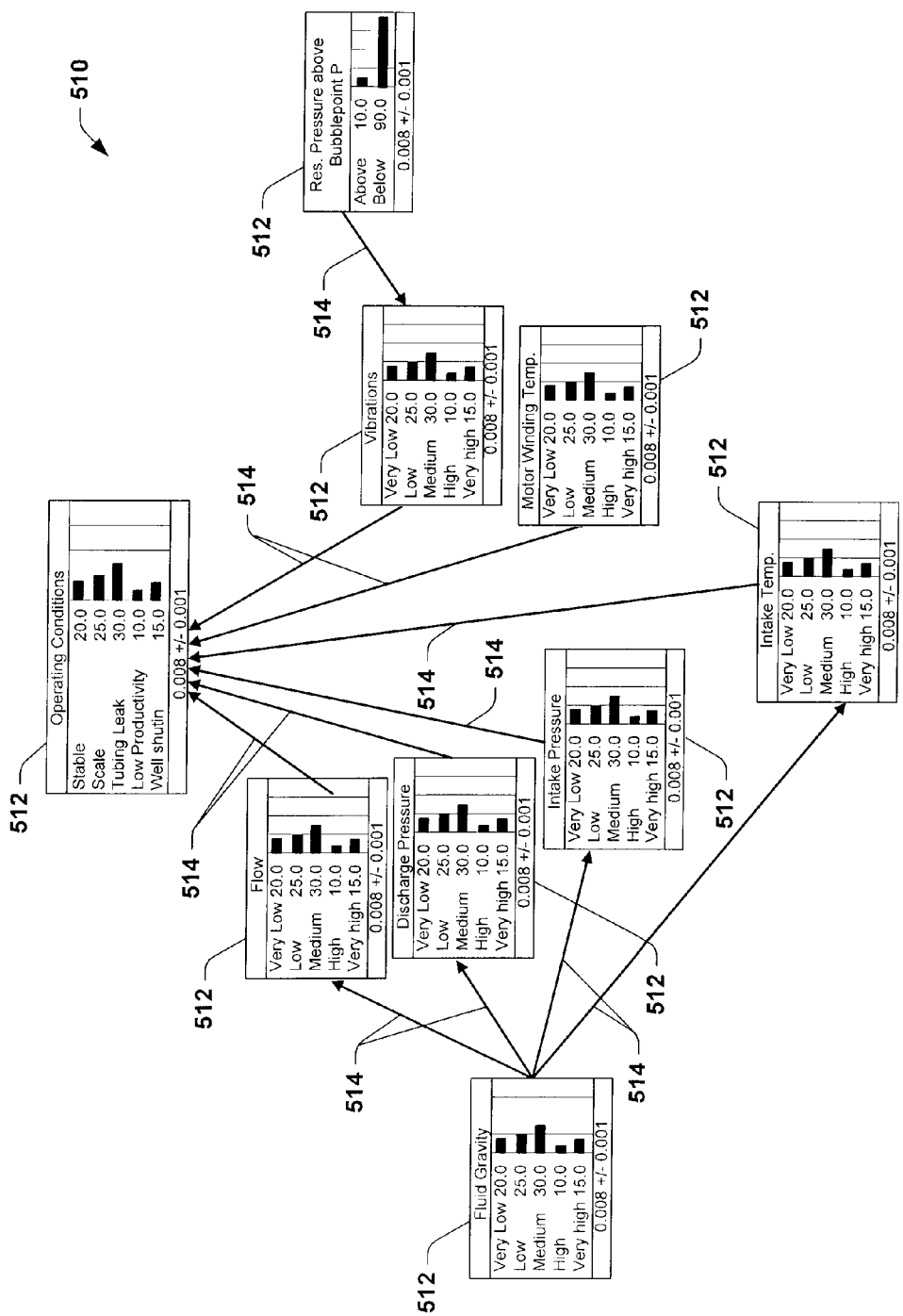
FIG. 11 shows an implementation of a Bayesian network structure that may be employed by a system or process in accordance with the teachings of the present disclosure.

At 426, a Bayesian network structure (or Business Identification model) may be determined or generated by the expert 414 (or other user). For example, FIG. 11 shows an implementation of a Bayesian network structure 510 that may be generated by the expert at 426. In this implementation, the Bayesian network structure 510 includes a plurality of variables (or nodes) 512 interconnected by a plurality of relationships (or influences) 514. In the implementation shown in FIG. 11, the plurality of variables 512 may represent those involved is operating an oil or gas production facility (e.g. operating conditions, fluid gravity, flow, discharge pressure, intake pressure, intake temperature vibrations, motor winding temperature, reservoir pressure above bubblepoint pressure, etc.).

Referring again to FIG. 8, as noted above, the expert 414 may perform data labeling at 428. In some implementations, the Bayesian network structure and labeled data, together with one or more expectations 429 (e.g. the expectations or predictions of the expert), may be stored to the case catalog 425.

The system 400 further includes a Bayesian network training portion 430 for training the Bayesian network structure (e.g. Bayesian network structure 510) using information stored in the case catalog 425. More specifically, one or more probabilities (or probability tables) associated with the variables 512 of the Bayesian network structure 510 may be trained or determined by the Bayesian network training portion 430. The functionalities of the Bayesian network training portion 430 may be configured using a wide variety of techniques. In the following discussion, certain implementations that may be performed by the Bayesian network training portion 430 will be described, however, it will be appreciated that for the sake of brevity, a complete description of other suitable techniques will be omitted.

For example, in some implementations, in order to fully specify the Bayesian network, and thus fully represent the joint probability distribution, a probability distribution for each variable X conditional upon the variable's parents can be specified for each variable X. The probability distribution of variable X conditional upon its parents may have any suitable form, including, for example, discrete or Gaussian distributions since that simplifies calculations. Sometimes only constraints on a distribution are known. In such cases, the training portion 430 may use the principle of maximum entropy to determine a single distribution, the one with the greatest entropy given the constraints.

Analogously, in at least some dynamic Bayesian networks, the training portion 430 may specify a conditional distribution for a hidden state's temporal evolution to maximize the entropy rate of an implied stochastic process. In some implementations, such conditional distributions may include parameters which are unknown but which are estimated from data, sometimes using a maximum likelihood approach. Direct maximization of a likelihood (or of a posterior probability) may often be complex when there are unobserved variables.

An approach to this problem involves an expectation-maximization algorithm which alternates computing expected values of the unobserved variables conditional on observed data, with maximizing the complete likelihood (or posterior) assuming that previously computed expected values are correct. Under mild regularity conditions, this approach may converge on maximum likelihood (or maximum posterior) values for parameters.

An alternate, more fully Bayesian approach to parameters which are unknown is to treat such parameters as additional unobserved variables, and to compute a full posterior distribution over all nodes conditional upon observed data, then to integrate out the parameters. This approach can be expensive and may lead to large dimension models, so in practice, the previous parameter-setting approaches are more common.

As further shown in FIG. 8, following the operation of the Bayesian network training portion 430, the system 400 determines the one or more probabilities (or probability tables) 432 associated with the variables of the network. The expert 414 may optionally intervene and provide probability determination input 434 to the one or more probabilities 432.

Figure 12:
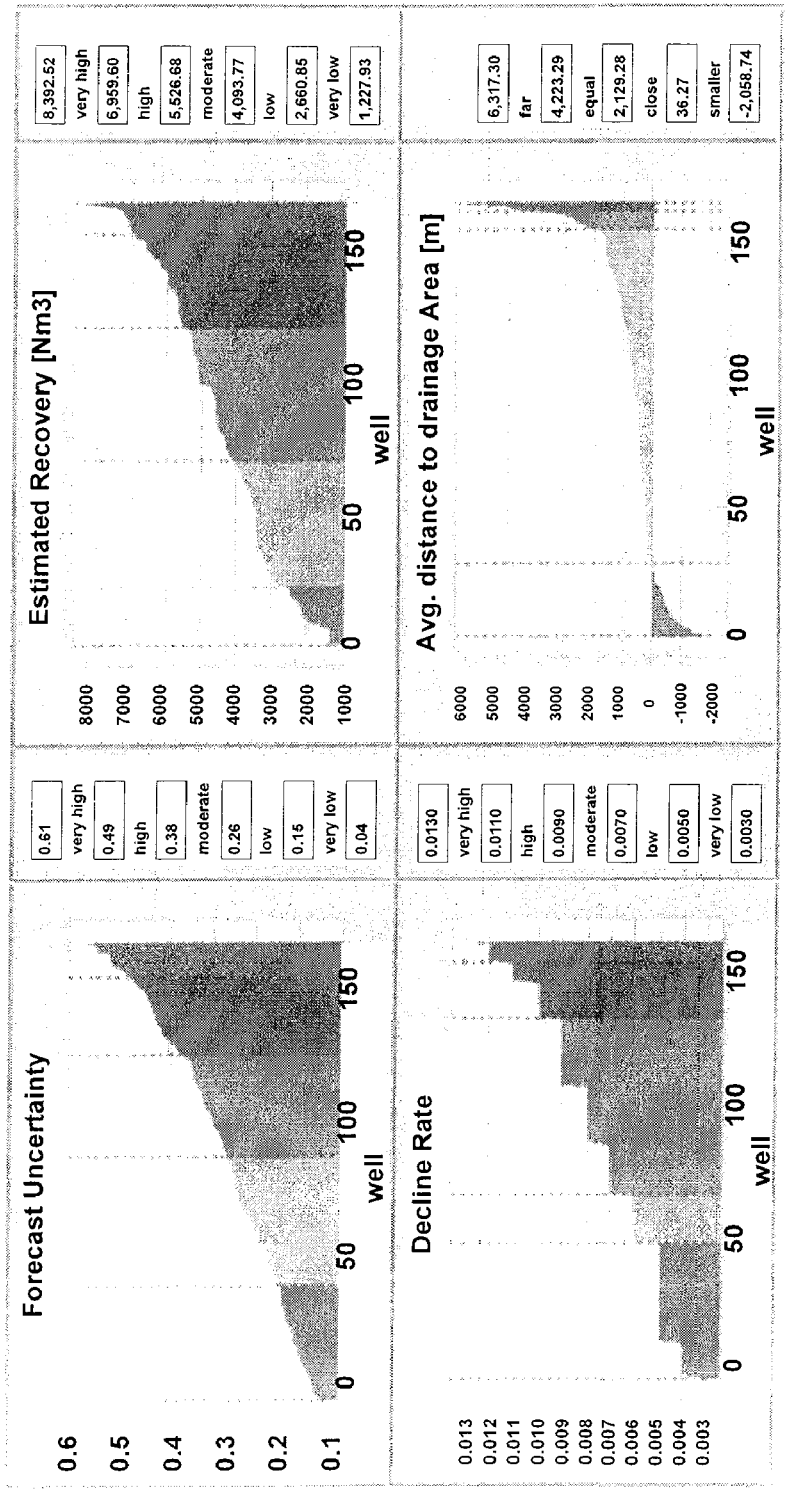
FIG. 12 shows a graphical representation of possible data ranges for a plurality of variables involved in an implementation of a Bayesian network in accordance with the teachings of the present disclosure.

In order to generalize the usage of the system 400, a range setup portion 435 may establish one or more data ranges before running trained Bayesian networks. For example. FIG. 12 shows a graphical representation 520 of possible data ranges for a plurality of variables (i.e. forecast uncertainty, estimated recovery, decline rate, and average distance to drainage area) involved in an implementation of a Bayesian network in accordance with the teachings of the present disclosure. Of course, the one or more data ranges shown in FIG. 12 are merely representative, and in alternate embodiments, any other suitable ranges and variables may be established.

With continued reference to FIG. 8, one or more recommendations may be assigned to one or more identified business opportunities at 436. The assignment of recommendations at 436 may include, for example, analysis, forecasting, optimization, or other appropriate activities, and preferably may be accomplished with modeling tools which may tolerate uncertainty. In some implementations, the assignment of recommendations at 436 may be performed by one or more experts 414, however, in alternate implementations, the assignment of recommendations may be partially or fully automated.

Automation of the recommendation assignment process at 436, and the aforesaid uncertainty tolerance, may necessitate relatively fast modeling tools. In some environments, such as some oil and gas production environments, traditional numerical simulation modeling may suffer from at least some disadvantages in such fast decision-making processes. On one hand, full-field numerical simulation may require considerable calculation times (e.g. several hours). On the other hand, most decision making processes in oil and gas production environments do not require long-term, full-field simulation forecasts anyway.

In at least some implementations, stochastic modeling techniques may provide satisfactory performance in such decision making processes as uncertainties can be handled through proxy models of the system, which still captures the dynamic and forecast ranges of the system. More specifically, methods like Monte Carlo methods tend to be used when it may be infeasible (or impossible) to compute an exact result with a deterministic algorithm. Such methods may provide a distribution of likely results in a relatively shorter, less computationally intensive period of time. Being able to consume such distributions, Bayesian networks are used for the reasoning in order to achieve superior results.

The system 400 further includes a Bayesian network deployment component 438 to perform one or more runtime probabilistic inferences. It will be appreciated that because a Bayesian network may be a complete model for the variables and their relationships, it can be used to answer probabilistic queries about them. For example, in some implementations, the Bayesian network can be used to find out updated knowledge of the state of a subset of variables when other variables (e.g. the evidence variables) are observed. The process of computing a posterior distribution of variables given evidence may be referred to as probabilistic inference. The posterior distribution of variables preferably provides a universal sufficient statistic for detection applications, when one wants to choose values for a variable subset which minimize some expected loss function, for instance, the probability of decision error. A Bayesian network can thus be considered a mechanism for automatically applying Bayes' theorem to complex problems.

Figure 13:
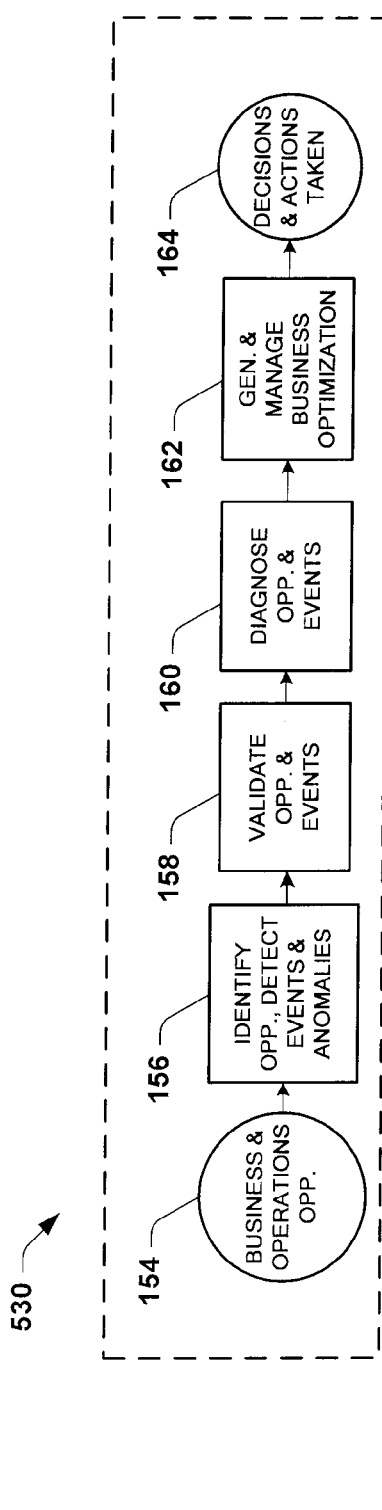
FIG. 13 shows an implementation of an opportunity identification and decision-making support process that may be performed by components of the system of FIG. 8 in accordance with the teachings of the present disclosure.

As further shown in FIG. 8, the system 400 further includes an opportunity identification component 440 and a decision support component 442. In some implementations, the operations of the opportunity identification and decision support components 440, 442 may include one or more portions of advisory processes described herein, including the advisory process 150 described above with reference to FIG. 3. For example, FIG. 13 shows an implementation of an opportunity identification and decision-making support process 530 that may be performed by the opportunity identification and decision support components 440, 442 of the system 400 of FIG. 8 in accordance with the teachings of the present disclosure. In this implementation, the process 530 includes the above-described portions 154 through 164 of the advisory process 150 of FIG. 3. For the sake of brevity, the descriptions of portions 154 through 164 provided above are incorporated herein by reference and will not be repeated herein.

In some implementations the opportunity identification and decision-making support process 530 shown in FIG. 13 may be automated in accordance with the teachings of the present disclosure. Business and operation opportunities may be indicated through changing relationships between measured, calculated and modeled parameters serving as input for the process 530. Such a set of input data may be called a pattern.

More specifically, business and operation opportunities may be detected and indicated through automated execution of the "Business Identification" Bayesian network 438 of FIG. 8. Results of the Bayesian network 438 may include predicted cases and probabilities of causes, which may be provided (e.g. visually displayed) as probabilities that certain business and operation opportunities may occur or have occurred.

The business logic of the system 400 may allow automated validation of each opportunity, however, more complex decision-making processes might need manual analysis and opportunity generation (e.g. optimization). In some implementations, validation of opportunities may be done in advance using historical data, and recommended actions may be pre-assigned to each possible opportunity (e.g. using the case catalog).

Figure 14:
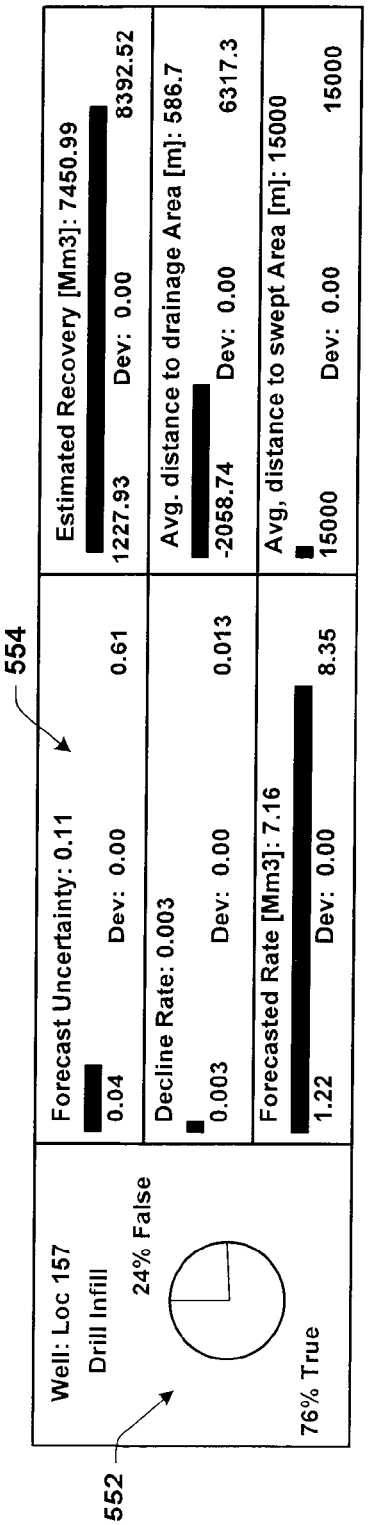
FIG. 14 shows a visual display of representative results of a sensitivity and root cause analysis using the Bayesian network deployment component in accordance with the teachings of the present disclosure.

In further implementations, a user can evaluate a result sensitivity using the Bayesian network deployment component 438. Impacts of changes in input parameters may be determined (and/or displayed) in changing results. In some implementations, such evaluations may also be used for a root cause analysis. For example, FIG. 14 shows a visual display 550 of representative results of a sensitivity and root cause analysis using the Bayesian network deployment component 438 in accordance with the teachings of the present disclosure. In this implementation, the visual display 550 includes a visual representation of an overall analysis result 552 (e.g. a pie chart showing relative percentages), and also a plurality of variable displays 554 (e.g. bar charts of uncertainty values and corresponding statistical characteristics) corresponding to various variables 554 involved in the formulation of the overall analysis result 552. Of course, in alternate implementations, a wide variety of suitable visual display techniques may be employed.

As noted above, if the analysis and opportunity generation is done in advance in support of the business logic of the system 400, these steps (e.g. the business logic supporting process 530) may be automated through predefined recommended actions. Related recommended actions can be displayed. Once the cause has been selected by the user, the user may inform other system users about the recommendation, such as through electronic mail or other mechanisms. In some implementations, the actual decision and related action taken can be automated (including closed loop control) through definition of the minimum probability (threshold) when a case (decision) shall automatically be selected.

In some implementations, several business opportunities may be determined simultaneously by the system 400, and the system 400 may provide a ranking list according to the scoring in a certain case. The user can then select one or more business opportunities which will be taken from the ranking list.

Referring again to FIG. 8, once a decision support analysis has been conducted, and/or once a business opportunity has been selected, a suitable designator (e.g. a user, an expert, an automated algorithm, etc.) may designate at 444 one or more individual opportunities (or analysis results) as cases to be fed back to the knowledge base 445 (e.g. to the case catalog 425). This may advantageously allow a self-improvement of the advisor system 400 through automation. The Bayesian network training component 430 may then be trained with the additional information using, for example, the extended case catalog 425. In some implementations, changes to the original network may be highlighted for subsequent review, and may be either approved or cancelled by the user or expert.

It will be appreciated that the results of the advisory system 400 may be used in a variety of ways. For example, based on one or more recommendations or process control settings selected (actions), performance improvements may be quantified. Depending on the type of business and operation opportunity, the performance improvements may be determined in different ways. For example, in some implementations, the performance improvements resulting from the results of the advisory system 400 may include the performance of preventive maintenance to reduce or avoid undesirable events (e.g. facility failures, Electric Submersible Pump (ESP) failures, etc.). In further implementations, the performance improvements may include improvements or optimization of operations to enable a facility or system to operate at full potential according to an objective function and existing constraints (e.g. gas lift optimization in oil and gas operations). In still other implementations, the performance improvements may include identification of new business opportunities, including those which may add value or increase operational output of a system (e.g. oil and gas production through infill drilling locations).

The above-noted performance improvements may preferably be measurable in order to review and capture effectiveness of the decision-making process, and thus improve future decision-making activities. For closed-loop control historical data and predefined operations, envelopes can be taken to determine the metrics. For non-closed-loop control, models can be used in order to forecast optimized (or desired) performance and a base case (or benchmark).

Figure 15:
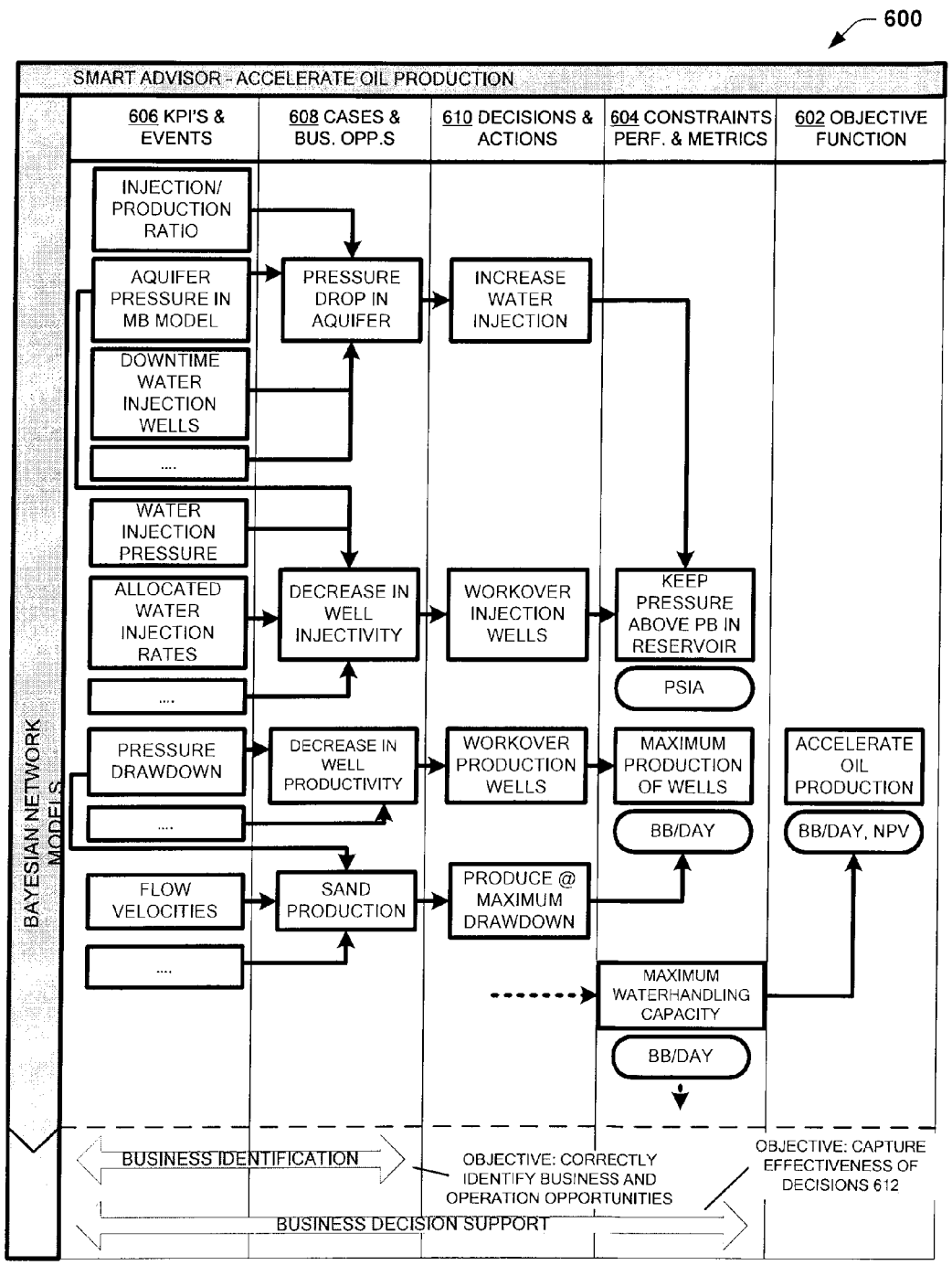
FIG. 15 shows an implementation of a representative workflow in accordance with the teachings of the present disclosure.

Alternately, a workflow may not necessarily proceed as described above. For example, in some implementations, a user may actually build or perform a workflow starting with a definition of an objective function. FIG. 15 shows an implementation of a representative workflow 600 in accordance with the teachings of the present disclosure. In this implementation the workflow 600 may begin with an objective function 602 (e.g. accelerate oil production). The relevant constraints on performance and related metrics 604 (e.g. pressure limits, production limits, etc.) may then be identified. Key Performance Indicators (KPI's) and events 606 may also be determined (e.g. pressures, rates, ratios, velocities, temperatures, etc.), and one or more cases or business opportunities 608 (e.g. pressure drop in aquifer, decrease in well injectivity, etc.) may be identified. Then, using a self-improving reasoning tool (system or process) having integrated data-driven modeling and knowledge in accordance with the teachings of the present disclosure (e.g. system 400), a user may determine one or more decisions and/or actions 610 that may be recommended by the reasoning tool to achieve the desired objective function 602.

Although not shown in FIG. 15, in order to manage one or more constraints in an improved or optimized manner, the workflow 600 may further include one or more corrective actions determined to improve performance after a case (business opportunity) has been identified from events. In some implementations, the user may define a period and/or other boundary conditions for the performance review in order to capture the effectiveness of decisions 612 based on measured and/or calculated metrics related to the constraints (e.g. as expected production increment target after correction action). Typically, effectiveness may be related to a comparison of an actual performance resulting from a decision versus a target or anticipated performance. Recommendations may then be altered according to an achieved effectiveness.

As noted above, feedback may be provided to systems and processes in accordance with the teachings of the present disclosure in order to update such reasoning tools (e.g. as described above with reference to the feedback component 444 of the system 400 of FIG. 8, the feedback component 166 of the process 150 of FIG. 3, the capture component 106 of the process 100 of FIG. 1, etc.) according to changing business and operation environments. In addition, to improve cases before adding them to the case catalog 425 (FIG. 8) (or other database), feedback can be given to apply the captured effectiveness to improve the information contained in the database, and thus, the advisory system.

Figure 16:
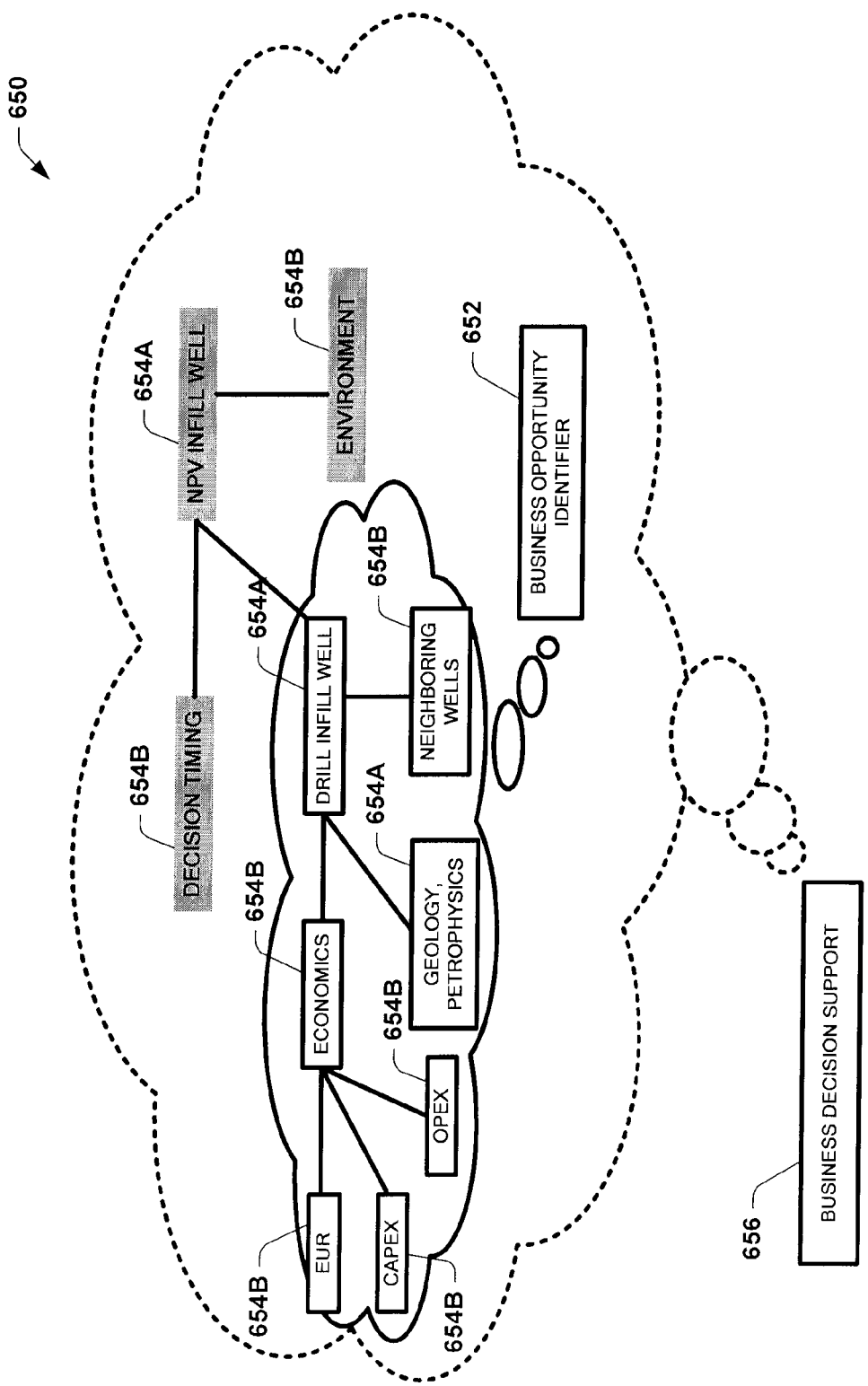
FIG. 16 shows an implementation of a staged reasoning process in accordance with the teachings of the present disclosure.

For example, FIG. 16 shows an implementation of a staged reasoning process 650 in accordance with the teachings of the present disclosure. In this implementation, the staged reasoning process 650 includes an opportunity identifier 652 that may depend, as described more fully above, on a plurality of variables and/or parameters 654. A decision support component 656 is at least partially based on the opportunity identifier 652, and thus, the plurality of variables and/or parameters 654. After results have been achieved using the opportunity identifier 652 and the decision support component 656, in the staged decision process 650, a user may review performance changes resulting from or related to the recommended actions or alternatives, and may update one or more of the variables and/or parameters 654. For example, in a possible implementation, some of the variables 654A may be held constant (e.g. geology, petrophysics, etc.) while other variables 654B may be adjusted (e.g. economic variables, decision timing, neighboring wells, etc.). In this way, the decision support component 656 may be based on the opportunity identifier 652 as well as one or more variables and/or parameters 654B after the decision was made and/or action was taken.

Figure 17:
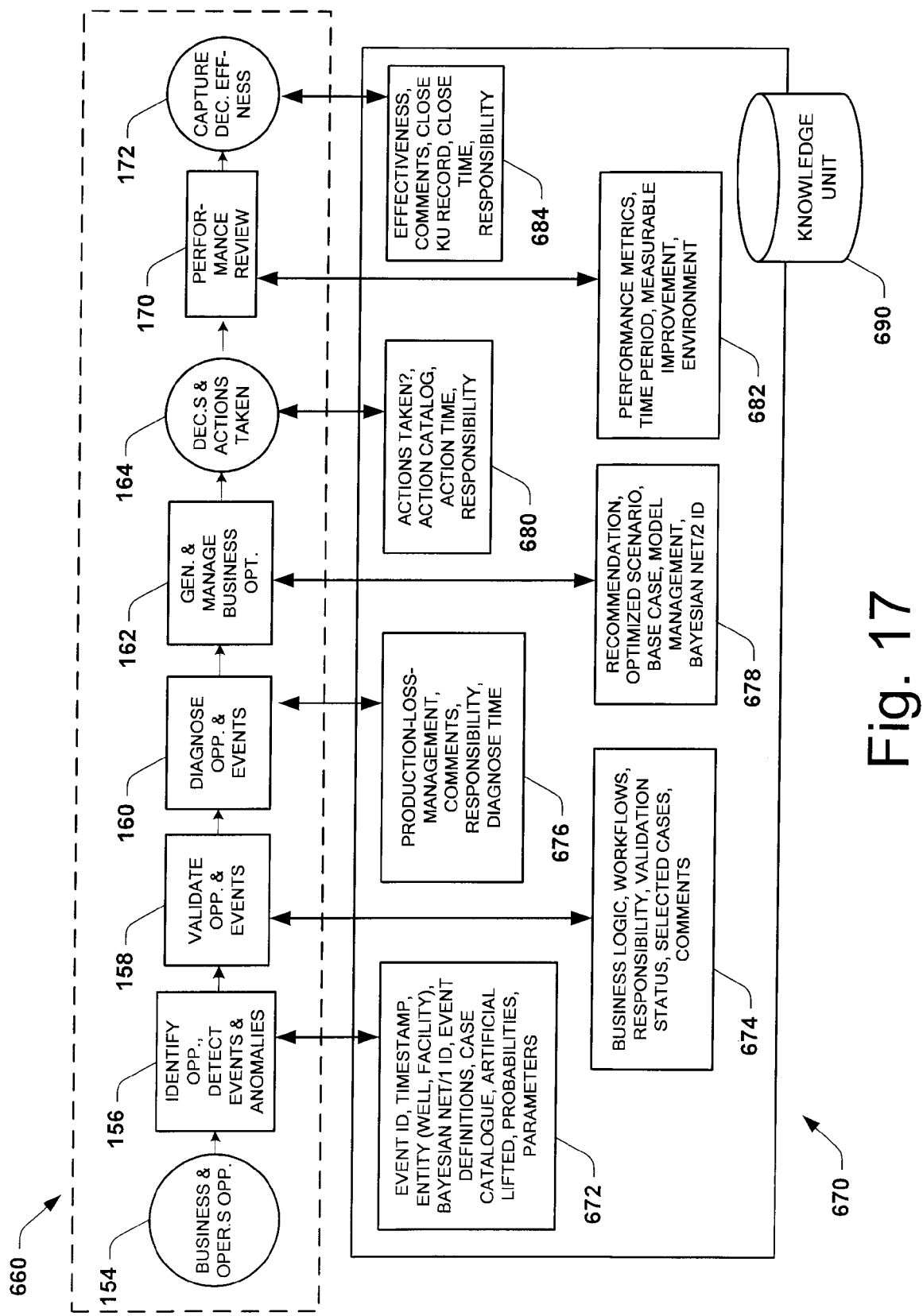
FIG. 17 presents an implementation of a process and a set of associated data storage activities in accordance with the teachings of the present disclosure.

It will be appreciated that a wide variety of information may be stored prior to and during performance of systems and processes in accordance with the teachings of the present disclosure. For example, FIG. 17 presents an implementation of a process 660 and a set of associated data storage activities 670 in accordance with the teachings of the present disclosure. In this implementation, the process 660 includes the above-described portions 154 through 172 of the advisory process 150 of FIG. 3. For the sake of brevity, the descriptions of portions 154 through 172 provided above are incorporated herein by reference and will not be repeated herein.

As shown in FIG. 17, information may be stored and/or retrieved along a decision making and performance review process (e.g. process 660). The information may be stored, for example in database tables contained within a data storage component 690. Each stored record may be triggered by a detected event and may have a unique identifier (ID) related to the event. Each record may be termed a "knowledge unit" as it makes contextual information around the event available for subsequent queries and data mining. The data storage component (or knowledge unit) 690 may represent one or more memories (or memory devices) of a system or process in accordance with the present disclosure where relevant information or pointers to information are stored.

More specifically, in the implementation shown in FIG. 17, the set of data storage activities 670 includes a first storing (and/or retrieving) activity at 672 (associated with process portion 156) that includes storing (and/or retrieving) one or more of: an event identifier, a timestamp, and entity identifier (e.g. well, facility, etc.), one or more event definitions, a case catalogue, an artificial lifted, one or more probabilities, and one or more parameters and/or variables. Similarly, a second storing (and/or retrieving) activity at 674 (associated with process portion 158) includes storing (and/or retrieving) one or more of: business logic, one or more workflows, responsibility, validation status, one or more selected cases, and one or more comments.

A third storing (and/or retrieving) activity at 676 (associated with process portion 160) includes storing (and/or retrieving) one or more of: production-loss-management, comments, responsibility, and diagnose time. Similarly, a fourth storing (and/or retrieving) activity at 678 (associated with process portion 162) includes storing (and/or retrieving) one or more of: recommendation, optimized scenario, base case, model management, and a Bayesian network identifier.

With continued reference to FIG. 17, a fifth storing (and/or retrieving) activity at 680 (associated with process portion 164) includes storing (and/or retrieving) one or more of: actions taken/selected, action catalog, action time, and responsibility. A sixth storing (and/or retrieving) activity at 682 (associated with process portion 170) includes storing (and/or retrieving) one or more of: one or more performance metrics, time period, measurable improvement metric (e.g. target vs actual production), and environment. And a seventh storing (and/or retrieving) activity at 684 (associated with process portion 172) includes storing (and/or retrieving) one or more of: effectiveness, one or more comments, close knowledge unit record, close time, and responsibility. Of course, in alternate implementations, the set of data storage activities 670 may vary from the implementation shown in FIG. 17.

Using implementations of systems and processes in accordance with the teachings of the present disclosure, decision support can be highly automated and generalized across different operating conditions. Such systems and processes can be self-improving with a minimum intervention of domain experts, and may also be able to capture user knowledge in order to make available a standardization workflow and repeatability of process optimization. A service-oriented architecture for such systems and processes may advantageously enable virtual asset management teams.

Figure 18:
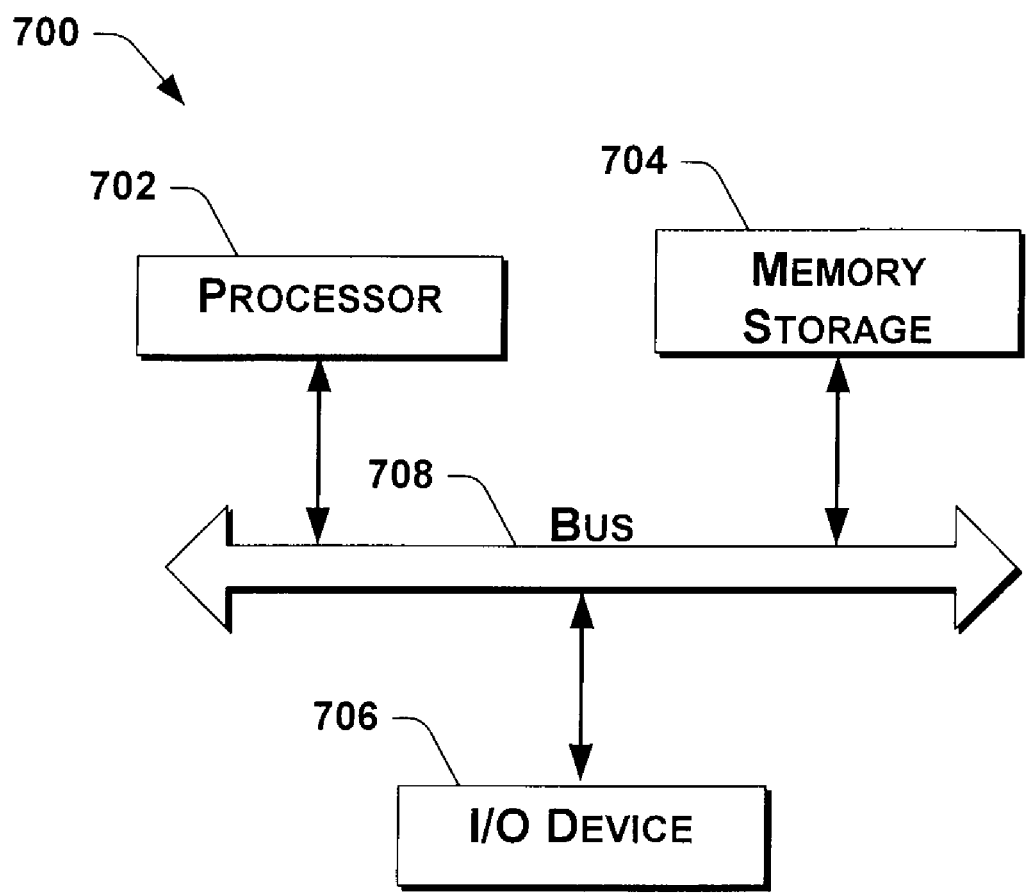
FIG. 18 illustrates an example computing device in which various implementations of systems and processes in accordance with the present disclosure can be implemented.

Systems and processes in accordance with the teachings of the present disclosure may be implemented in a wide variety of configurations, including hardware, software, firmware, or combinations thereof. For example, FIG. 18 illustrates an example computing device 700 that can implement the various techniques described herein, and which may be representative, in whole or in part, of the elements described herein. Computing device 700 is only one example of a computing device and is not intended to suggest any limitation as to scope of use or functionality of the computing device and/or its possible architectures. Neither should computing device 700 be interpreted as having any dependency or requirement relating to any one or combination of components illustrated in the example computing device 700.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 may include volatile media (such as random access memory (RAM)) and/or nonvolatile media (such as read only memory (ROM), Flash memory, optical disks, magnetic disks, and so forth). Component 704 may also include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules or other data. Computer storage media include, but are not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Although embodiments of systems and processes having integrated data-driven modeling and knowledge into a self-improving reasoning tool have been described in language specific to structural features and/or methods, it is to be understood that the subject of the appended claims is not necessarily limited to the specific features or methods described. Rather, the specific features and methods are disclosed as exemplary implementations of integrating data-driven modeling and knowledge into a self-improving reasoning tool.

What is claimed is:

1. A method, comprising:
    determining at least one recommended action using a reasoning component having a data-driven modeling portion and a knowledge-based portion, wherein determining includes integrating one or more determination aspects determined by the data-driven modeling portion and one or more additional determination aspects determined by the knowledge-based portion;
    determining an effectiveness of the at least one recommended action in association with implementation of the at least one recommended action;
    updating data accessed by at least one of the data-driven modeling component to determine the one or more determination aspects, or the knowledge-based component to determine the one or more additional determination aspects, based at least in part upon the determination of the effectiveness of the at least one recommended action;
    preparing data including decision feedback for interventions and evaluation of effectiveness; and
    performing data clustering operations on data accessed by the data-driven modeling portion prior to determining the one or more determination aspects, the data clustering operations including:
        clustering data into one or more data clusters representative of one or more corresponding determination aspects;
        training one or more data-driven components using the one or more data clusters; and
        based on the training, correcting at least one data cluster.

2. The method of claim 1, wherein determining at least one recommended action using a reasoning component having a data-driven modeling portion and a knowledge-based portion includes:
    identifying one or more opportunities based on the integrating; and
    selecting the at least one recommended action from the one or more identified opportunities.

3. The method of claim 2, wherein selecting the at least one recommended action from the one or more identified opportunities includes:
    selecting the at least one recommended action from the one or more identified opportunities based at least partially on an objective function.

4. The method of claim 1, further comprising:
    selecting at least one objective function prior to determining the at least one recommended action, and wherein determining further includes integrating the one or more determination aspects, the one or more additional determination aspects, and the at least one objective function.

5. The method of claim 1, further comprising:
    integrating one or more determination aspects determined by the data-driven modeling portion and one or more additional determination aspects determined by the knowledge-based portion includes; and
    integrating one or more probabilities determined by the data-driven modeling portion and one or more additional probabilities determined by the knowledge-based portion.

6. The method of claim 1, further comprising:
    integrating one or more determination aspects determined by the data-driven modeling portion and one or more additional determination aspects determined by the knowledge-based portion includes; and integrating first and second probabilities determined by first and second components, respectively, the first and second components each including at least one of a self-organizing map, a decision tree, a neural network, a visualization, a Bayesian network, a proxy model, an expert system, or a Monte Carlo simulation.

7. The method of claim 1, further comprising:
performing one or more data integration operations on data accessed by the data-driven modeling portion prior to determining the one or more determination aspects.

8. The method of claim 7, wherein performing one or more data integration operations on data accessed by the data-driven modeling portion prior to determining the one or more determination aspects includes:
performing a back-population operation on data accessed by the data-driven modeling portion prior to determining the one or more determination aspects.

9. A system, comprising:
at least one processing component;
a memory component operatively coupled to the at least one processing component; and
one or more computer-readable instructions stored on the memory component that, when executed by the at least one processing component, configure the system to:
determine one or more determination aspects using a data-driven modeling component;
determine one or more additional determination aspects using a knowledge-based component;
provide a recommended action at least partially based on integrating the one or more determination aspects determined by the data-driven modeling component and the one or more additional determination aspects determined by the knowledge-based component;
determine an effectiveness of the at least one recommended action in association with implementation of the at least one recommended action;
update data accessed by at least one of the data-driven modeling component to determine the one or more determination aspects, or the knowledge-based component to determine the one or more additional determination aspects, based at least in part upon the determination of the effectiveness of the at least one recommended action; and
prepare data including decision feedback for interventions and evaluation of effectiveness.

10. The system of claim 9, further comprising:
at least one input/output device operatively communicating with the at least one processing component, and wherein the one or more computer-readable instructions further configure the system to enable a knowledge input via the at least one input/output device from a knowledge provider into the determination of the one or more additional aspects by the knowledge-based component.

11. The system of claim 10, wherein the one or more computer-readable instructions further configure the system to:
enable the knowledge input from the knowledge provider between the determination of the one or more determination aspects determined by the data-driven modeling component and the determination of the one or more additional determination aspects determined by the knowledge-based component via an interactive wizard.

12. The system of claim 9, wherein the one or more computer-readable instructions further configure the system to:
perform one or more machine learning operations during integrating of the one or more determination aspects determined by the data-driven modeling component and the one or more additional determination aspects determined by the knowledge-based component.

13. The system of claim 9, further comprising:
a database of fossil fuel production information stored within the memory component, and wherein the one or more computer-readable instructions further configure the system to determine at least one recommended fossil fuel production action to achieve a selected fossil fuel production function, the database of fossil fuel production information including one or more of pressures, temperatures, well rates, calculated parameters, ratios, or model results.

14. The system of claim 13, wherein the one or more computer-readable instructions configure the system to determine at least one recommended fossil fuel production action to achieve an increase in fossil fuel production, the at least one recommended fossil fuel production action including at least one of optimizing water and/or gas lift injection, pressure drawdown, workover wells, recompletion, pump efficiency, downtime, sand production, or other operational constraints.

15. A method of determining a recommended action, comprising:
capturing a plurality of events based on one or more of key performance indicators and knowledge;
identifying one or more possible actions using a prediction process that includes integrating a data-driven model and a knowledge-based logic;
selecting a recommended action from the one or more identified actions;
implementing the recommended action, including managing one or more constraints in an optimized way and to meet at least one defined objective function; and
capturing an effectiveness of the implemented action into the plurality of events based on one or more of key performance indicators and knowledge;
wherein identifying one or more possible actions using a prediction process that includes integrating a data-driven model and a knowledge-based logic includes:
training the data-driven model, including unsupervised training of a network of inter-related variables using at least a portion of the captured plurality of events based on the one or more of key performance indicators and knowledge;
applying expert reasoning to at least one of correct or supplement a result of the unsupervised training of the network; and
performing an active learning to link the unsupervised training and the expert reasoning.

16. The method of claim 15, wherein identifying one or more possible actions using a prediction process that includes integrating a data-driven model and a knowledge-based logic includes:
integrating one or more recommendations based on at least one of expertise or modeling tools into the integrating of the data-driven model and the knowledge-based logic.

* * * * *